US012791709B2

(12) United States Patent
Sergeev

(10) Patent No.: US 12,791,709 B2
(45) **Date of Patent: *Nov. 10, 2026**

(54) SYSTEMS AND METHODS FOR POINT-TO-POINT OBJECT MATCHING AND TARGETING

(71) Applicant: Carbon Autonomous Robotic Systems Inc., Seattle, WA (US)

(72) Inventor: Alexander Igorevich Sergeev, Newcastle, WA (US)

(73) Assignee: Carbon Autonomous Robotic Systems Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/071,626

(22) Filed: Mar. 5, 2025

(65) Prior Publication Data

US 2025/0216548 A1 Jul. 3, 2025

Related U.S. Application Data

(63) Continuation of application No. 17/576,814, filed on Jan. 14, 2022, now Pat. No. 12,270,903.

(Continued)

(51) Int. Cl.

*G01S 17/04* (2020.01)
*G01S 17/06* (2006.01)

(Continued)

(52) U.S. Cl.

CPC .............. *G01S 17/04* (2020.01); *G01S 17/06* (2013.01); *G01S 17/86* (2020.01); *G01S 17/87* (2013.01); *G06V 20/188* (2022.01); *G06V 20/56* (2022.01)

(58) Field of Classification Search

CPC .......... G01S 17/04; G01S 17/06; G01S 17/86; G01S 17/87; G01S 7/4802; G01S 15/89;

(Continued)

(56) References Cited

U.S. PATENT DOCUMENTS

| | | | |
|---|---|---|---|
| 2,848,119 | A | 8/1958 | Fitser |
| 3,302,052 | A | 1/1967 | Schwab |

(Continued)

FOREIGN PATENT DOCUMENTS

| | | | |
|---|---|---|---|
| AU | 2022238342 | A1 | 8/2023 |
| CA | 2705830 | A1 | 5/2009 |

(Continued)

OTHER PUBLICATIONS

Nadimi, et al., “Designing, modeling and controlling a novel autonomous laser weeding system”, ASABE Technical Library—Jan. 2009; pp. 8.

(Continued)

*Primary Examiner* — Tarifur R Chowdhury
*Assistant Examiner* — Akbar H. Rizvi
(74) *Attorney, Agent, or Firm* — Fortem IP LLP

(57) ABSTRACT

Disclosed herein are methods, devices, modules, and systems which may be employed for accurate targeting of objects. A method of point-to-point targeting may be implemented by systems with two or more sensors to locate an object and coordinate a handoff between the two or more sensors. These methods, devices, modules, and systems may be used for automated crop cultivation or maintenance. Devices disclosed herein may be configured to locate, identify, and autonomously target a weed with a beam, such as a laser beam, which may burn or irradiate the weed. The methods, devices, modules, and systems may be used for agricultural crop management or for at-home weed control.

20 Claims, 15 Drawing Sheets

Related U.S. Application Data

(60) Provisional application No. 63/162,285, filed on Mar. 17, 2021.

(51) Int. Cl.
*G01S 17/86* (2020.01)
*G01S 17/87* (2020.01)
*G06V 20/10* (2022.01)
*G06V 20/56* (2022.01)

(58) Field of Classification Search
CPC ..... G01S 2013/9323; G01S 2013/9324; G01S 7/417; G01S 13/87; G01S 13/89; G01S 15/86; G01S 15/87; G01S 17/88; G01S 13/862; G01S 13/865; G01S 7/4972; G01S 17/894; G06V 20/188; G06V 20/56; G06V 10/245; A01M 21/046; A01B 79/005
See application file for complete search history.

(56) References Cited

U.S. PATENT DOCUMENTS

| | | | |
|---|---|---|---|
| 3,618,609 | A | 11/1971 | Glick et al. |
| 3,675,621 | A | 7/1972 | Griffin et al. |
| 3,741,214 | A | 6/1973 | Tillander |
| 3,778,155 | A | 12/1973 | Leavitt |
| 6,199,000 | B1 | 3/2001 | Keller et al. |
| 6,477,403 | B1 | 11/2002 | Eguchi et al. |
| 6,553,299 | B1 | 4/2003 | Keller et al. |
| 6,795,568 | B1 | 9/2004 | Christensen et al. |
| 7,526,100 | B1 | 4/2009 | Hartman et al. |
| 7,859,519 | B2 | 12/2010 | Tulbert |
| 7,919,723 | B2 | 4/2011 | Ide et al. |
| 7,993,585 | B2 | 8/2011 | Black et al. |
| 8,216,214 | B2 | 7/2012 | Weir |
| 8,665,436 | B2 | 3/2014 | Pagnoux et al. |
| 8,746,914 | B2 | 6/2014 | Nelson et al. |
| 9,000,340 | B2 | 4/2015 | Dicander |
| 9,207,309 | B2 | 12/2015 | Bridges |
| 9,289,122 | B2 | 3/2016 | Chinnock et al. |
| 9,456,067 | B2 | 9/2016 | Rudow et al. |
| 9,462,446 | B2 | 10/2016 | Rudow et al. |
| 9,467,814 | B2 | 10/2016 | Rudow et al. |
| 9,476,695 | B2 | 10/2016 | Becker et al. |
| 9,565,848 | B2 | 2/2017 | Stowe et al. |
| 9,609,859 | B2 | 4/2017 | Stowe et al. |
| 9,639,941 | B2 | 5/2017 | Rudow et al. |
| 9,654,222 | B1 | 5/2017 | Shatz et al. |
| 9,709,987 | B2 | 7/2017 | Hyde et al. |
| 9,955,551 | B2 | 4/2018 | Spero |
| 9,992,396 | B1 | 6/2018 | Scepanovic et al. |
| 10,006,872 | B2 | 6/2018 | Seo et al. |
| 10,010,067 | B2 | 7/2018 | Kent et al. |
| 10,051,854 | B2 | 8/2018 | Stowe et al. |
| 10,126,415 | B2 | 11/2018 | Becker et al. |
| 10,183,542 | B1 | 1/2019 | Bittner et al. |
| 10,226,036 | B2 | 3/2019 | Guice et al. |
| 10,241,207 | B2 | 3/2019 | Rosenzweig et al. |
| 10,371,935 | B1 | 8/2019 | Patel |
| 10,489,621 | B2 | 11/2019 | Moriyama |
| 10,502,555 | B2 | 12/2019 | Nakamura et al. |
| 10,624,275 | B1 | 4/2020 | Lewis |
| 10,684,370 | B2 | 6/2020 | Demersseman et al. |
| 10,750,736 | B2 | 8/2020 | Kent et al. |
| 10,776,639 | B2 | 9/2020 | Steinberg et al. |
| 10,905,397 | B2 | 2/2021 | Yang et al. |
| 11,048,940 | B2 | 6/2021 | Kiepe et al. |
| 11,076,589 | B1 | 8/2021 | Sibley et al. |
| 11,093,745 | B2 | 8/2021 | Redden et al. |
| 11,129,343 | B2 | 9/2021 | Redden et al. |
| 11,153,499 | B2 | 10/2021 | Behrooz et al. |
| 11,255,663 | B2 | 2/2022 | Binder |
| 11,344,022 | B2 | 5/2022 | Jackson et al. |
| 11,373,288 | B2 | 6/2022 | Peters |
| 11,375,707 | B1 | 7/2022 | Guice et al. |
| 11,399,531 | B1 | 8/2022 | Sibley et al. |
| 11,425,852 | B2 | 8/2022 | Sibley et al. |
| 11,432,470 | B2 | 9/2022 | Kurihara et al. |
| 11,504,748 | B2 | 11/2022 | Shniberg et al. |
| 11,517,008 | B1 | 12/2022 | Sibley et al. |
| 11,526,997 | B2 | 12/2022 | Sibley et al. |
| 11,553,634 | B2 | 1/2023 | Grant et al. |
| 11,553,636 | B1 | 1/2023 | Palomares et al. |
| 11,589,570 | B2 | 2/2023 | Schlemmer |
| 11,602,143 | B2 | 3/2023 | Mikesell et al. |
| 11,694,434 | B2 | 7/2023 | Sibley et al. |
| 11,748,976 | B2 | 9/2023 | Redden et al. |
| 11,751,559 | B2 | 9/2023 | Sibley et al. |
| 11,785,873 | B2 | 10/2023 | Sibley et al. |
| 11,937,524 | B2 | 3/2024 | Sibley et al. |
| 12,056,845 | B2 | 8/2024 | Peake et al. |
| 12,108,752 | B2 | 10/2024 | Mikesell et al. |
| 12,127,547 | B2 | 10/2024 | Mikesell et al. |
| 12,193,378 | B1 | 1/2025 | Wallach et al. |
| 12,219,948 | B1 | 2/2025 | Mikesell et al. |
| 12,270,903 | B2 | 4/2025 | Sergeev |
| 2013/0034263 | A1 | 2/2013 | Ding et al. |
| 2013/0194548 | A1 | 8/2013 | Francis et al. |
| 2014/0311014 | A1 | 10/2014 | Feugier |
| 2015/0070712 | A1 | 3/2015 | Cramer et al. |
| 2015/0071490 | A1 | 3/2015 | Fukata et al. |
| 2015/0075067 | A1 | 3/2015 | Stowe et al. |
| 2015/0075068 | A1 | 3/2015 | Stowe et al. |
| 2015/0245554 | A1 | 9/2015 | Redden |
| 2016/0117560 | A1 | 4/2016 | Levi et al. |
| 2016/0181764 | A1 | 6/2016 | Kanskar et al. |
| 2016/0205917 | A1 | 7/2016 | Chan et al. |
| 2016/0205918 | A1 | 7/2016 | Chan et al. |
| 2016/0286779 | A1 | 10/2016 | Guice |
| 2017/0053167 | A1 | 2/2017 | Ren et al. |
| 2017/0146654 | A1 | 5/2017 | Halloran et al. |
| 2017/0188564 | A1 | 7/2017 | Stowe et al. |
| 2017/0359943 | A1 | 12/2017 | Calleija et al. |
| 2018/0136319 | A1 | 5/2018 | Send et al. |
| 2018/0285482 | A1 | 10/2018 | Santos et al. |
| 2019/0097722 | A1 | 3/2019 | Mclaurin et al. |
| 2019/0154439 | A1 | 5/2019 | Binder |
| 2019/0159442 | A1 | 5/2019 | Benjegerdes |
| 2019/0200519 | A1 | 7/2019 | Chrysanthakopoulos et al. |
| 2019/0274296 | A1 | 9/2019 | Schmidt |
| 2019/0285893 | A1 | 9/2019 | Wang et al. |
| 2019/0353784 | A1 | 11/2019 | Toledano et al. |
| 2020/0012852 | A1 | 1/2020 | Ding et al. |
| 2020/0034630 | A1* | 1/2020 | Oami ...................... G06T 7/246 |
| 2020/0116643 | A1 | 4/2020 | Kun et al. |
| 2020/0120886 | A1 | 4/2020 | Geltner |
| 2020/0134392 | A1 | 4/2020 | Gui et al. |
| 2020/0150446 | A1 | 5/2020 | Thibon et al. |
| 2020/0205394 | A1 | 7/2020 | Day et al. |
| 2020/0327326 | A1 | 10/2020 | Gavish et al. |
| 2020/0342225 | A1 | 10/2020 | Schumann et al. |
| 2021/0076662 | A1 | 3/2021 | Mikesell et al. |
| 2021/0118117 | A1 | 4/2021 | Albrecht et al. |
| 2021/0158041 | A1 | 5/2021 | Chowdhary et al. |
| 2021/0230904 | A1 | 7/2021 | Pizzato et al. |
| 2022/0095638 | A1 | 3/2022 | Demaster et al. |
| 2022/0254155 | A1 | 8/2022 | Janssen et al. |
| 2022/0299635 | A1 | 9/2022 | Sergeev |
| 2022/0361475 | A1 | 11/2022 | Bachman et al. |
| 2022/0391614 | A1 | 12/2022 | Du et al. |
| 2022/0408673 | A1 | 12/2022 | Penn |
| 2023/0044040 | A1 | 2/2023 | Xu et al. |
| 2023/0121291 | A1 | 4/2023 | Sibley et al. |
| 2023/0122084 | A1 | 4/2023 | Sibley et al. |
| 2023/0137419 | A1 | 5/2023 | Sergeev et al. |
| 2023/0232811 | A1 | 7/2023 | Einat |
| 2023/0237697 | A1 | 7/2023 | Pillmann et al. |
| 2023/0247928 | A1 | 8/2023 | Sibley et al. |
| 2023/0252624 | A1 | 8/2023 | Sergeev et al. |
| 2023/0252789 | A1 | 8/2023 | Sibley et al. |
| 2023/0252791 | A1 | 8/2023 | Webb et al. |
| 2023/0270036 | A1 | 8/2023 | Groffils et al. |

(56) References Cited

U.S. PATENT DOCUMENTS

| | | | |
|---|---|---|---|
| 2023/0292736 | A1 | 9/2023 | Mikesell et al. |
| 2023/0292737 | A1 | 9/2023 | Thompson et al. |
| 2023/0309444 | A1 | 10/2023 | Cordeiro et al. |
| 2023/0333011 | A1 | 10/2023 | Dev et al. |
| 2023/0343090 | A1 | 10/2023 | Khait et al. |
| 2023/0360392 | A1 | 11/2023 | Sibley et al. |
| 2023/0363370 | A1 | 11/2023 | Delatree et al. |
| 2023/0371493 | A1 | 11/2023 | Werner et al. |
| 2023/0384794 | A1 | 11/2023 | Brossard et al. |
| 2023/0397597 | A1 | 12/2023 | Charipar et al. |
| 2023/0404056 | A1 | 12/2023 | Sibley et al. |
| 2023/0413800 | A1 | 12/2023 | Jasko et al. |
| 2024/0020951 | A1 | 1/2024 | Redden et al. |
| 2024/0032525 | A1 | 2/2024 | Petro et al. |
| 2024/0041018 | A1 | 2/2024 | Mikesell et al. |
| 2024/0049697 | A1 | 2/2024 | Schmeer et al. |
| 2024/0057502 | A1 | 2/2024 | Sibley et al. |
| 2024/0074425 | A1 | 3/2024 | Banitt |
| 2024/0074427 | A1 | 3/2024 | Tanner |
| 2024/0116083 | A1 | 4/2024 | Ayal et al. |
| 2024/0155221 | A1 | 5/2024 | Watanabe |
| 2024/0206451 | A1 | 6/2024 | Anderson |
| 2024/0224977 | A9 | 7/2024 | Leger et al. |
| 2024/0251694 | A1 | 8/2024 | Sibley et al. |
| 2024/0268246 | A1 | 8/2024 | Stark et al. |
| 2024/0268277 | A1 | 8/2024 | Cochrane et al. |
| 2024/0394884 | A1 | 11/2024 | Williams et al. |
| 2025/0031684 | A1 | 1/2025 | Mikesell et al. |
| 2025/0081959 | A1 | 3/2025 | Mikesell et al. |
| 2025/0176525 | A1 | 6/2025 | Mikesell et al. |
| 2025/0239060 | A1 | 7/2025 | Cochrane et al. |
| 2026/0004578 | A1 | 1/2026 | Pillmann et al. |
| 2026/0011143 | A1 | 1/2026 | Pillmann et al. |

FOREIGN PATENT DOCUMENTS

| | | | |
|---|---|---|---|
| CN | 105045950 | A | 11/2015 |
| CN | 114641666 | A | 6/2022 |
| EP | 1098563 | B1 | 2/2003 |
| EP | 2848119 | B1 | 12/2016 |
| EP | 3159651 | A1 | 4/2017 |
| EP | 3302052 | B1 | 10/2019 |
| EP | 3700337 | A1 | 9/2020 |
| EP | 3700338 | A1 | 9/2020 |
| EP | 3937628 | A1 | 1/2022 |
| EP | 4031832 | A1 | 7/2022 |
| EP | 4147942 | A1 | 3/2023 |
| EP | 4175470 | A2 | 5/2023 |
| EP | 3618609 | B1 | 8/2023 |
| EP | 4228403 | A1 | 8/2023 |
| EP | 4228404 | A1 | 8/2023 |
| EP | 4243592 | A1 | 9/2023 |
| EP | 4243613 | A1 | 9/2023 |
| EP | 4031832 | A4 | 10/2023 |
| EP | 4301135 | A1 | 1/2024 |
| EP | 4309129 | A1 | 1/2024 |
| EP | 4185106 | B1 | 5/2024 |
| EP | 4358712 | A1 | 5/2024 |
| EP | 4358713 | A1 | 5/2024 |
| EP | 4358714 | A1 | 5/2024 |
| EP | 3675621 | B1 | 8/2024 |
| EP | 3741214 | B1 | 8/2024 |
| EP | 4418845 | A1 | 8/2024 |
| JP | H1134573 | A | 2/1999 |
| JP | 2001275541 | A | 10/2001 |
| JP | 2015041136 | A | 3/2015 |
| JP | 2015062412 | A | 4/2015 |
| JP | 2018525976 | A | 9/2018 |
| JP | 2022548645 | A | 11/2022 |
| KR | 20150124305 | A | 11/2015 |
| WO | 2002017705 | A1 | 7/2004 |
| WO | 2009126264 | A2 | 10/2009 |
| WO | 2013111134 | A1 | 8/2013 |
| WO | 2019064062 | A1 | 4/2019 |
| WO | 2019079556 | A1 | 4/2019 |
| WO | 2019144231 | A1 | 8/2019 |
| WO | 2019222109 | A1 | 11/2019 |
| WO | 2020008465 | A1 | 1/2020 |
| WO | 2021055485 | A1 | 3/2021 |
| WO | 2022006643 | A1 | 1/2022 |
| WO | 2022043568 | A2 | 3/2022 |
| WO | 2022197831 | A1 | 9/2022 |
| WO | 2023021769 | A1 | 2/2023 |
| WO | 2023058333 | A1 | 4/2023 |
| WO | 2023150023 | A1 | 8/2023 |
| WO | 2023180566 | A1 | 9/2023 |
| WO | 2024165111 | A1 | 8/2024 |
| WO | 2024168302 | A1 | 8/2024 |
| WO | 2026006307 | A2 | 1/2026 |
| WO | 2026006307 | A3 | 1/2026 |

OTHER PUBLICATIONS

"NAIO Technologies, Market Gardens, Plant Nurseries, Horticulture, Aromatic and Medicinal Plant Farming", OZ Brochure, Jul. 30, 2019, 8 Pages.

Amjoud, et al., "Convolutional Neural Networks Backbones for Object Detection", Springer, ICISP 2020, LNCS 12119, 2020, pp. 282-289.

Farmwise-Flyer, "Vulcan", World Ag Expo, Feb. 14, 2023, Retrieved from the internet URL: https://farmwise.io/assets/downloads/Farmwise-Flyer-2023.pdf, 2 pages.

Gosselink, et al., "Lignin as a Renewable Aromatic Resource for the Chemical Industry", PhD Thesis, Wageningen University, Wageningen, NL, 2011, 198 pages.

Wu, et al., "Design and Implementation of Computer Vision based in-Row Weeding System", HAL Open Science. hal-01876696, 2018, 8 pages.

Guy, et al., "Detection and counting of flowers on apple trees for better chemical thinning decisions", Precision Agriculture, vol. 21, Aug. 20, 2019 (Aug. 20, 2019), pp. 503-521, XP037106018.

Magalhaes, et al., "Evaluating the Single-Shot MultiBox Detector and YOLO Deep Learning Models for the Detection of Tomatoes in a Greenhouse", Arxiv.org, Sep. 2, 2021 (Sep. 2, 2021), XP091049720.

Sivakumar, et al., "Comparison of Object Detection and Patch-Based Classification Deep Learning Models on Mid-to Late-Season Weed Detection in UAV Imagery", Remote Sensing, vol. 12, Jul. 3, 2020 (Jul. 3, 2020), p. 2136, XP093224257.

* cited by examiner

ISO View

SYSTEMS AND METHODS FOR POINT-TO-POINT OBJECT MATCHING AND TARGETING

CROSS-REFERENCE

This application is a continuation of U.S. patent application Ser. No. 17/576,814, filed Jan. 14, 2022, which claims the benefit of U.S. Provisional Application No. 63/162,285, entitled "SYSTEMS AND METHODS FOR POINT-TO-POINT OBJECT MATCHING AND TARGETING," filed on Mar. 17, 2021, which application is herein incorporated by reference in its entirety for all purposes.

BACKGROUND

As technology advances, tasks that had previously been performed by humans are increasingly becoming automated. While tasks performed in highly controlled environments, such as factory assembly lines, can be automated by directing a machine to perform the task the same way each time, tasks performed in unpredictable environments, such as driving on city streets or vacuuming a cluttered room, depend on dynamic feedback and adaptation to perform the task. Autonomous systems often struggle to identify and locate objects in unpredictable environments. Improved methods of object detection, location, and targeting would advance automation technology and increase the ability of autonomous systems to react and adapt to unpredictable environments.

SUMMARY

In various aspects, the present disclosure provides a method of targeting an object comprising: collecting a prediction image using a prediction sensor; identifying an object to be targeted in the prediction image; determining a predicted location of the object based on the prediction image; pointing a targeting sensor toward the predicted location; collecting a targeting image of the predicted location using the targeting sensor; identifying the object in the targeting image; and determining a target location of the object based on the targeting image.

In some aspects, the method further comprises pointing the targeting sensor toward the target location. In some aspects, pointing the targeting sensor toward the target location comprises determining an offset between a first position of the targeting sensor and a second position of the targeting sensor. In some aspects, the targeting sensor is pointed toward the target location when the targeting sensor is positioned at the second position of the targeting sensor. In some aspects, the target location is closer to the object than the predicted location. In some aspects, the targeting sensor is associated with an implement.

In some aspects, the method further comprises directing the implement toward the target location. In some aspects, directing the implement toward the target location comprises determining an offset between a first position of the implement and a second position of the implement. In some aspects, the implement is directed toward the target location when the implement is positioned at the second position of the implement. In some aspects, the targeting sensor and the implement are coupled to one another. In some aspects, pointing of the targeting sensor and directing of the implement are correlated.

In some aspects, the method further comprises manipulating the object using the implement. In some aspects, manipulating the object comprises irradiating the object with electromagnetic radiation. In some aspects, the electromagnetic radiation is infrared light. In some aspects, manipulating the object comprises moving the object. In some aspects, manipulating the object comprises spraying the object.

In some aspects, the prediction sensor differs from the targeting sensor in one or more parameters selected from the group consisting of sensor type, sensor resolution, magnification, field of view, color balance, and color sensitivity. In some aspects, the prediction sensor is positioned at a different angle, distance, or both relative to the object than the targeting sensor. In some aspects, the prediction sensor and the targeting sensor are coupled to a vehicle. In some aspects, the vehicle is in motion. In some aspects, the predicted location accounts for motion of the vehicle relative to the object between a time the prediction image is collected and a time the targeting image is collected. In some aspects, the target location accounts for motion of the vehicle relative to the object between a time the targeting image is collected and a time the manipulation is performed.

In some aspects, the object is located on, above, or below a surface. In some aspects, the surface is a non-planar surface. In some aspects, the surface is an agricultural surface. In some aspects, the surface is a construction surface. In some aspects, the offset accounts for variability in depth of the surface. In some aspects, the target location is no more than 50 mm, no more than 25 mm, no more than 10 mm, no more than 5 mm, no more than 3 mm, no more than 2 mm, or no more than 1 mm from the object.

In some aspects, the prediction sensor is selected from the group consisting of a camera, a light detection and ranging (LIDAR) sensor, a photodetector, an active-pixel sensor, a semiconductor detector, an ultrasound sensor, a RADAR detector, a sonar sensor, and a photodiode array. In some aspects, the targeting sensor is selected from the group consisting of a camera, a light detection and ranging (LIDAR) sensor, a photodetector, an active-pixel sensor, a semiconductor detector, an ultrasound sensor, a RADAR detector, a sonar sensor, and a photodiode array.

In some aspects, identifying the object in the targeting image comprises matching the object in the targeting image to the object in the prediction image. In some aspects, the matching comprises using a trained machine learning model to match the object in the targeting image to the object in the prediction image. In some aspects, identifying the object in the prediction image comprises using a trained machine learning model to identify the object. In some aspects, the trained machine learning model is a deep learning model. In some aspects, the object is selected from the group consisting of a weed, a plant, and an obstruction.

In some aspects, the predicted location comprises a location in the prediction image, a position of the targeting sensor, a position of the implement, a position of the prediction sensor, a position of the object on the surface, a position of the vehicle, or a combination thereof. In some aspects, the target location comprises a location in the targeting image, a position of the targeting sensor, a position of the implement, a position of the prediction sensor, a position of the object on the surface, a position of the vehicle, or a combination thereof.

In various aspects, the present disclosure provides a system for targeting an object comprising: a prediction system comprising a prediction sensor and an object identification module; and a targeting system comprising a targeting sensor, an actuator configured to control the targeting sensor, and an object matching module; wherein the prediction sensor is configured to collect a prediction image, wherein the object identification module is configured to identify an object to be targeted in the prediction image and determine a predicted location of the object based on the prediction image; wherein the targeting module is configured to receive the predicted location of the object from the object identification module; wherein the actuator is configured to point the targeting sensor toward the predicted location of the object; wherein the targeting sensor is configured to collect a targeting image of the predicted location; and wherein the object matching module is configured to locate the object in the targeting image and determine a target location of the object based on the targeting image.

In some aspects, the actuator is configured to point the targeting sensor toward the target location. In some aspects, the target location is closer to object than the predicted location. In some aspects, the actuator is configured to rotate or translate a mirror. In some aspects, rotation or translation of the mirror points the targeting sensor.

In some aspects, the targeting module further comprises an implement directed by the actuator. In some aspects, pointing of the targeting sensor and directing of the implement are fixed relative to each other. In some aspects, the implement is configured to manipulate the object. In some aspects, the implement comprises a laser. In some aspects, the laser is an infrared laser. In some aspects, the implement comprises a grabber. In some aspects, the implement comprises a sprayer.

In some aspects, the prediction sensor differs from the targeting sensor in one or more parameter selected from the group consisting of sensor type, sensor resolution, magnification, field of view, color balance, and color sensitivity. In some aspects, the prediction sensor is positioned at a different angle, distance, or both relative to the object than the targeting sensor. In some aspects, the object identification module comprises a trained machine learning model. In some aspects, the object matching module comprises a trained machine learning model. In some aspects, the trained machine learning model is a deep learning model.

In some aspects, the object is selected from the group consisting of a weed, a plant, and an obstruction. In some aspects, the system is configured to perform a method of the present disclosure.

In various aspects, the present disclosure provides a method of locating an object comprising: locating a first object in an image collected by a first sensor; locating a second object in an image collected by a second sensor; determining that the second object is the same as the first object using an object matching deep learning model trained with a first set of training images and a second set of training images.

In some aspects, the first set of training images are collected by the first sensor and the second set of training images are collected by the second sensor. In some aspects, the first sensor differs from the second sensor in one or more parameter selected from the group consisting of sensor type, sensor resolution, magnification, field of view, color balance, and color sensitivity. In some aspects, the first sensor is positioned at a different angle, distance, or both relative to the object than the second sensor. In some aspects, the method further comprises matching the second object to the first object.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and in the accompanying drawings of which:

DETAILED DESCRIPTION

Figure 1:
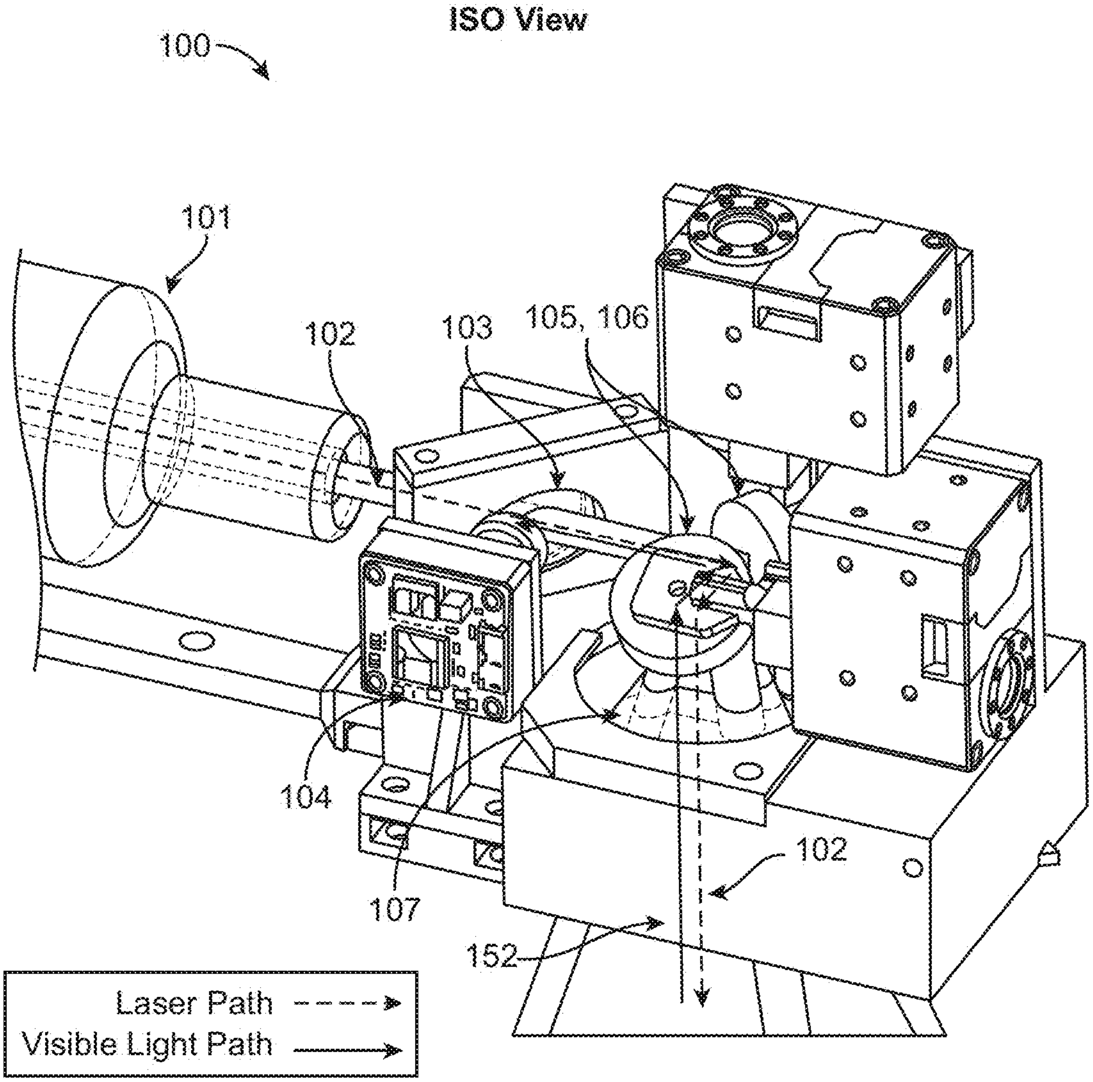
FIG. 1 illustrates an isometric view of a laser optical system with the laser path and visible light path indicated, in accordance with one or more embodiments herein.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

The present disclosure provides systems and methods for point-to-point object matching and targeting to autonomously coordinate object detection between multiple sensors. Autonomous systems, such as self-driving cars, often depend on electromagnetic sensors to detect and identify objects in order to interact with, or avoid interacting with, the objects. Multiple sensors may be used in an autonomous system to expand detection angle, increase field of view, or improve detection resolution. However, coordination of multiple sensors can be challenging, particularly if the sensors differ, for example in resolution, field of view, color sensitivity, positioning, or sensor type.

Described herein are systems and methods for coordinating object detection, location, and targeting between two or more sensors of a detection system. The systems and methods of the present disclosure may be used to locate an object with a first sensor, identify the same object in a second sensor, and manipulate the object. The first sensor may be used to determine a predicted location of the object, and the second sensor may be used to refine the location of the object to determine a target location of the object. The target location of the object may be more accurate than the predicted location of the object.

The systems and methods of the present disclosure may have a wide range of applications involving identification, detection, and precisely targeting an object located in an irregular or unpredictable environment. For example, systems and methods of the present disclosure may be used to accurately locate and manipulate an object on an uneven or non-planar surface, such as a plant in a field or a piece of debris in a construction site. Alternatively or in addition, systems and methods of the present disclosure may be used to accurately locate and target an object or area within a larger area, such as an agricultural field within a satellite image collected from orbit, or a smaller area within a field.

In some embodiments, coordinating object detection between two or more sensors may increase object localization accuracy while maintaining a wide field of view by first locating the object with a wide-field sensor and then identifying the same object in a sensor with a narrower field of view. In some embodiments, coordinating object detection between two or more sensors may increase rate of object detection and targeting by enabling parallel targeting of multiple objects. For example, multiple objects may be located with a wide-field sensor, a first object may be assigned to a first targeting module, a second object may be assigned to a second targeting module, and a third object may be assigned to a third targeting module; each of the first, second, and third objects may be located and targeted by the first, second, and third targeting modules, respectively.

Coordinating object detection between two or more sensors may be difficult for objects located in an unpredictable environment or on an uneven or non-planar surface. Irregularities in the three-dimensional position of an object, for example resulting from positioning of the object on an uneven surface, may lead to decreased localization accuracy of the object and may result in differences in localization of the object in an image collected by a first sensor and localization of the same object in an image collected by the second sensor. For example, an object located on a non-planar surface may appear to be in a different location in an image collected by a first sensor and in an image collected by a second sensor. The methods described herein may enable accurate localization of objects between two or more sensors by using machine learning models, such as a deep learning model, to account for irregularities in the object or the environment.

As used herein, an "image" may refer to a representation of a region or object. For example, an image may be a visual representation of a region or object formed by electromagnetic radiation (e.g., light, x-rays, microwaves, or radio waves) scattered off of the region or object. In another example, an image may be a point cloud model formed by a light detection and ranging (LIDAR) or a radio detection and ranging (RADAR) sensor. In another example, an image may be a sonogram produced by detecting sonic, infrasonic, or ultrasonic waves reflected off of the region or object. As used herein, "imaging" may be used to describe a process of collecting or producing a representation (e.g., an image) of a region or an object.

As used herein a position, such as a position of an object or a position of a sensor, may be expressed relative to a frame of reference. Exemplary frames of reference include a surface frame of reference, a vehicle frame of reference, a sensor frame of reference, or an actuator frame of reference. Positions may be readily converted between frames of reference, for example by using a conversion factor or a calibration model. While a position, a change in position, or an offset may be expressed in a one frame of reference, it should be understood that the position, change in position, or offset may be expressed in any frame of reference or may be readily converted between frames of reference.

Detection Systems

In some embodiments, a detection system of the present disclosure, configured to perform a method of the present disclosure, may comprise a prediction system and a targeting system. The prediction system may comprise a prediction sensor configured to image a region of interest, and the targeting system may comprise a targeting sensor configured to image a portion of the region of interest. Imaging may comprise collecting a representation (e.g., an image) of the region of interest or the portion of the region of interest. In some embodiments, the prediction system may comprise a plurality of prediction sensors, enabling coverage of a larger region of interest. In some embodiments, the targeting system may comprise a plurality of targeting sensors.

The region of interest may correspond to a region of overlap between the targeting sensor field of view and the prediction sensor field of view. Such overlap may be contemporaneous or may be temporally separated. For example, the prediction sensor field of view encompasses the region of interest at a first time and the targeting sensor field of view encompasses the region of interest at a second time but not at the first time. Optionally, the detection system may move relative to the region of interest between the first time and the second time, facilitating temporally separated overlap of the prediction sensor field of view and the targeting sensor field of view.

In some embodiments the prediction sensor may have a wider field of view than the targeting sensor. The prediction system may further comprise an object identification module to identify an object of interest in a prediction image or representation collected by the prediction sensor. The object identification module may differentiate an object of interest from other objects in the prediction image.

The prediction module may determine a predicted location of the object of interest and may send the predicted location to the targeting system.

The targeting system may point the targeting sensor toward a desired portion of the region of interest predicted to contain the object, based on the predicted location received from the prediction system. The targeting system may comprise an object matching module to determine whether or not the object of interest identified by the prediction system is present in a targeting image or representation collected by the targeting sensor. If the object matching module determines that the object of interest is present in the targeting image, the targeting module may determine a target location of the object of interest. The target location of the object may be closer to the actual location of the object than the predicted location of the object. In some embodiments, the targeting module may use the target location of the object to direct an implement toward the object. In some embodiments, the implement may perform an action on or manipulate the object.

A detection system of the present disclosure may be used to target objects on a surface, such as the ground, a floor, a wall, an agricultural field, a lawn, a road, a mound, a pile, or a pit. In some embodiments, the surface may be a non-planar surface, such as uneven ground, uneven terrain, or a textured floor. For example, the surface may be uneven ground at a construction site, in an agricultural field, or in a mining tunnel, or the surface may be uneven terrain containing fields, roads, forests, hills, mountains, houses, or buildings. The detection systems described herein may locate an object on a non-planar surface more accurately, faster, or within a larger area than a single sensor system or a system lacking an object matching module.

Alternatively or in addition, a detection system may be used to target objects that may be spaced from the surface they are resting on, such as a tree top distanced from its grounding point, and/or to target objects that may be locatable relative to a surface, for example, relative to a ground surface in air or in the atmosphere. In addition, a detection system may be used to target objects that may be moving relative to a surface, for example, a vehicle, an animal, a human, or a flying object.

Optical Control Systems

The methods described herein may be implemented by an optical control system, such as a laser optical system, to target an object of interest. For example, an optical system may be used to target an object of interest identified in an image or representation collected by a first sensor, such as a prediction sensor, and locate the same object in an image or representation collected by a second sensor, such as a targeting sensor. In some embodiments, the first sensor is a prediction camera and the second sensor is a targeting camera. Targeting the object may comprise precisely locating the object using the targeting sensor and targeting the object with an implement.

Described herein are optical control systems for directing a beam, for example a light beam, toward a target location on a surface, such as a location of an object of interest. Referring to FIG. 1-FIG. 7, an exemplary system for object identification and point-to-point targeting will now be described. In the illustrated embodiments, the implement is a laser. However, other implements are within the scope of the present disclosure, including but not limited to a grabbing implement, a spraying implement, a planting implement, a harvesting implement, a pollinating implement, a marking implement, a blowing implement, or a depositing implement.

FIG. 1 illustrates an isometric view of an embodiment of an optical control system 100 as disclosed herein. An emitter 101 is configured to direct a beam along an optical path, for example a laser path 102. In some embodiments, the beam comprises electromagnetic radiation, for example light, radio waves, microwaves, or x-rays. In some embodiments, the light is visible light, infrared light, or ultraviolet light. The beam may be coherent. In one embodiment, the emitter is a laser, such as an infrared laser.

In some embodiments, the emitter emits a beam having a wavelength of about 1 m, about 100 mm, about 10 mm, about 1 mm, about 100 μm, about 10 μm, about 1.5 μm, about 1 μm, about 900 nm, about 800 nm, about 700 nm, about 600 nm, about 500 nm, about 400 nm, about 300 nm, about 100 nm, about 10 nm, or about 1 nm. In some embodiments, the emitter emits a beam having a wavelength from about 1 m to about 100 mm, from about 100 mm to about 10 mm, from about 10 mm to about 1 mm, from about 1 mm to about 100 μm, from about 100 μm to about 10 μm, from about 10 μm to about 1.5 μm, from about 1.5 μm to about 1 μm, from about 1 μm to about 900 nm, from about 900 nm to about 800 nm, from about 800 nm to about 700 nm, from about 700 nm to about 600 nm, from about 600 nm to about 500 nm, from about 500 nm to about 400 nm, from about 400 nm to about 300 nm, from about 300 nm to about 100 nm, from about 100 nm to about 10 nm, or from about 10 nm to about 1 nm.

In some embodiments, the emitter may be capable of emitting electromagnetic radiation up to 10 mW, up to 100 mW, up to 1 W, up to 10 W, up to 100 W, up to 1 kW, or up to 10 kW. In some embodiments, the emitter may be capable of emitting electromagnetic radiation from 10 mW to 100 mW, from 100 mW to 1 W, from 1 W to 10 W, from 10 W to 100 W, from 100 W to 1 kW, or from 1 kW to 10 kW.

One or more optical elements may be positioned in a path of the beam. The optical elements may comprise one or more of a beam combiner 103, a first reflective element 105, and a second reflective element 106. The elements may be configured in the order of the beam combiner 103, followed by the first reflective element 105, followed by the second reflective element 106, in the direction of the beam path.

In another example, one or both of the first reflective element 105 or the second reflective element 106 may be configured before the beam combiner 103, in order of the direction of the beam path. In another example, the optical elements may be configured in the order of the beam combiner 103, followed by the first reflective element 105 in order of the direction of the beam path. In another example, one or both of the first reflective element 105 or the second reflective element 106 may be configured before the beam combiner 103, in the direction of the beam path. Any number of additional reflective elements may be positioned in the beam path.

The beam combiner 103 may also be referred to as a beam combining element. In some embodiments, the beam combiner 103 may be a zinc selenide (ZnSe), zinc sulfide (ZnS), or germanium (Ge) beam combiner. For example, the beam combiner 103 may be configured to transmit infrared light and reflect visible light. In some embodiments, the beam combiner 103 may be a dichroic. In some embodiments, the beam combiner 103 may be configured to pass electromagnetic radiation having a wavelength longer than a cutoff wavelength and reflect electromagnetic radiation having a wavelength shorter than the cutoff wavelength. In some embodiments, the beam combiner may be configured to pass electromagnetic radiation having a wavelength shorter than a cutoff wavelength and reflect electromagnetic radiation having a wavelength longer than the cutoff wavelength.

In some embodiments, the cutoff wavelength may be about 1 m, about 100 mm, about 10 mm, about 1 mm, about 100 μm, about 10 μm, about 1.5 μm, about 1 μm, about 900 nm, about 800 nm, about 700 nm, about 600 nm, about 500 nm, about 400 nm, about 300 nm, about 100 nm, about 10 nm, or about 1 nm. In some embodiments, the cutoff wavelength may be from about 1 m to about 100 mm, from about 100 mm to about 10 mm, from about 10 mm to about 1 mm, from about 1 mm to about 100 μm, from about 100 μm to about 10 μm, from about 10 μm to about 1.5 μm, from about 1.5 μm to about 1 μm, from about 1 μm to about 900 nm, from about 900 nm to about 800 nm, from about 800 nm to about 700 nm, from about 700 nm to about 600 nm, from about 600 nm to about 500 nm, from about 500 nm to about 400 nm, from about 400 nm to about 300 nm, from about 300 nm to about 100 nm, from about 100 nm to about 10 nm, or from about 10 nm to about 1 nm. In other embodiments, the beam combiner may be a polarizing beam splitter, a long pass filter, a short pass filter, or a band pass filter.

An optical control system of the present disclosure may further comprise a lens positioned in the optical path. In some embodiments, a lens may be a focusing lens positioned such that the focusing lens focuses the beam, the scattered light, or both. For example, a focusing lens may be positioned in the visible light path to focus the scattered light onto the targeting camera. In some embodiments, a lens may be a defocusing lens positioned such that the defocusing lens defocuses the beam, the scattered light, or both. In some embodiments, the lens may be a collimating lens positioned such that the collimating lens collimates the beam, the scattered light, or both. In some embodiments, two or more lenses may be positioned in the optical path. For example, two lenses may be positioned in in the optical path in series to expand or narrow the beam.

The positions and orientations of one or both of the first reflective element 105 and the second reflective element 106 may be controlled by actuators. In some embodiments, an actuator may be a motor, a solenoid, a galvanometer, or a servo. For example, the position of the first reflective element 105 may be controlled by a first actuator, and the position and orientation of the second reflective element 106 may be controlled by a second actuator. In some embodiments, a single reflective element may be controlled by a plurality of actuators. For example, the first reflective element 105 may be controlled by a first actuator along a first axis and a second actuator along a second axis. In some embodiments, a single actuator may control a reflective element along a plurality of axes.

An actuator may change a position of a reflective element by rotating the reflective element, thereby changing an angle of incidence of a beam encountering the reflective element. Changing the angle of incidence may cause a translation of the position at which the beam encounters the surface. In some embodiments, the angle of incidence may be adjusted such that the position at which the beam encounters the surface is maintained while the optical system moves with respect to the surface. In some embodiments, the first actuator rotates the first reflective element about a first rotational axis, thereby translating the position at which the beam encounters the surface along a first translational axis, and the second actuator rotates the second reflective element about a second rotational axis, thereby translating the position at which the beam encounters the surface along a second translational axis. In some embodiments, a first actuator and a second actuator rotate a first reflective element about a first rotational axis and a second rotational axis, thereby translating the position at which the beam encounters the surface of the first reflective element along a first translational axis and a second translational axis. For example, a single reflective element may be controlled by a first actuator and a second actuator, providing translation of the position at which the beam encounters the surface along a first translation axis and a second translation axis with a single reflective element controlled by two actuators.

The first translational axis and the second translational axis may be orthogonal. A coverage area on the surface may be defined by a maximum translation along the first translational axis and a maximum translation along the second translation axis. One or both of the first actuator and the second actuator may be servo-controlled, piezoelectric actuated, piezo inertial actuated, stepper motor-controlled, galvanometer-driven, linear actuator-controlled, or any combination thereof. One or both of the first reflective element and the second reflective element may be a mirror; for example, a dichroic mirror, or a dielectric mirror; a prism; a beam splitter; or any combination thereof. In some embodiments, one or both of the first reflective element and the second reflective element may be any element capable of deflecting the beam.

Figure 2:
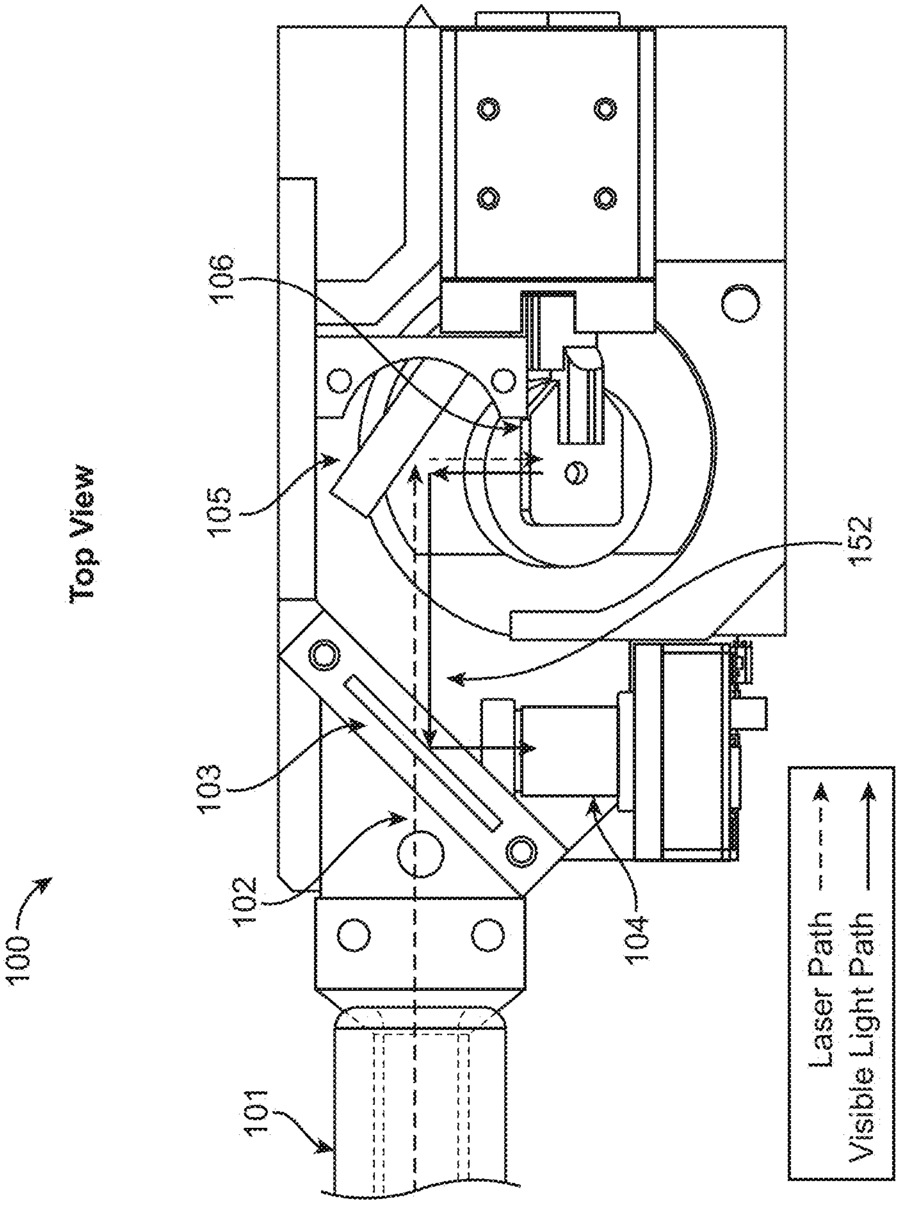
FIG. 2 illustrates a top view of a laser optical system with the laser path and visible light path indicated, in accordance with one or more embodiments herein.

FIG. 2 shows a top view of an embodiment of an optical control system 100 as shown in FIG. 1. As seen in FIG. 1, the targeting camera 104 may be positioned to capture light, for example visible light, traveling along a visible light path 152 in a direction opposite the beam path, for example laser path 102. The light may be scattered by a surface, such as the surface with an object of interest, or an object, such as an object of interest, and travel toward the targeting camera 104 along visible light path 152. In some embodiments, the targeting camera 104 is positioned such that it captures light reflected off of the beam combiner 103. In other embodiments, the targeting camera 104 is positioned such that it captures light transmitted through the beam combiner 103. With the capture of such light, the targeting camera 104 may be configured to image a target field of view on a surface. The targeting camera 104 may be coupled to the beam combiner 103, or the targeting camera 104 may be coupled to a support structure supporting the beam combiner 103. In one embodiment, the targeting camera 104 does not move with respect to the beam combiner 103, such that the targeting camera 104 maintains a fixed position relative to the beam combiner 103.

Figure 3:
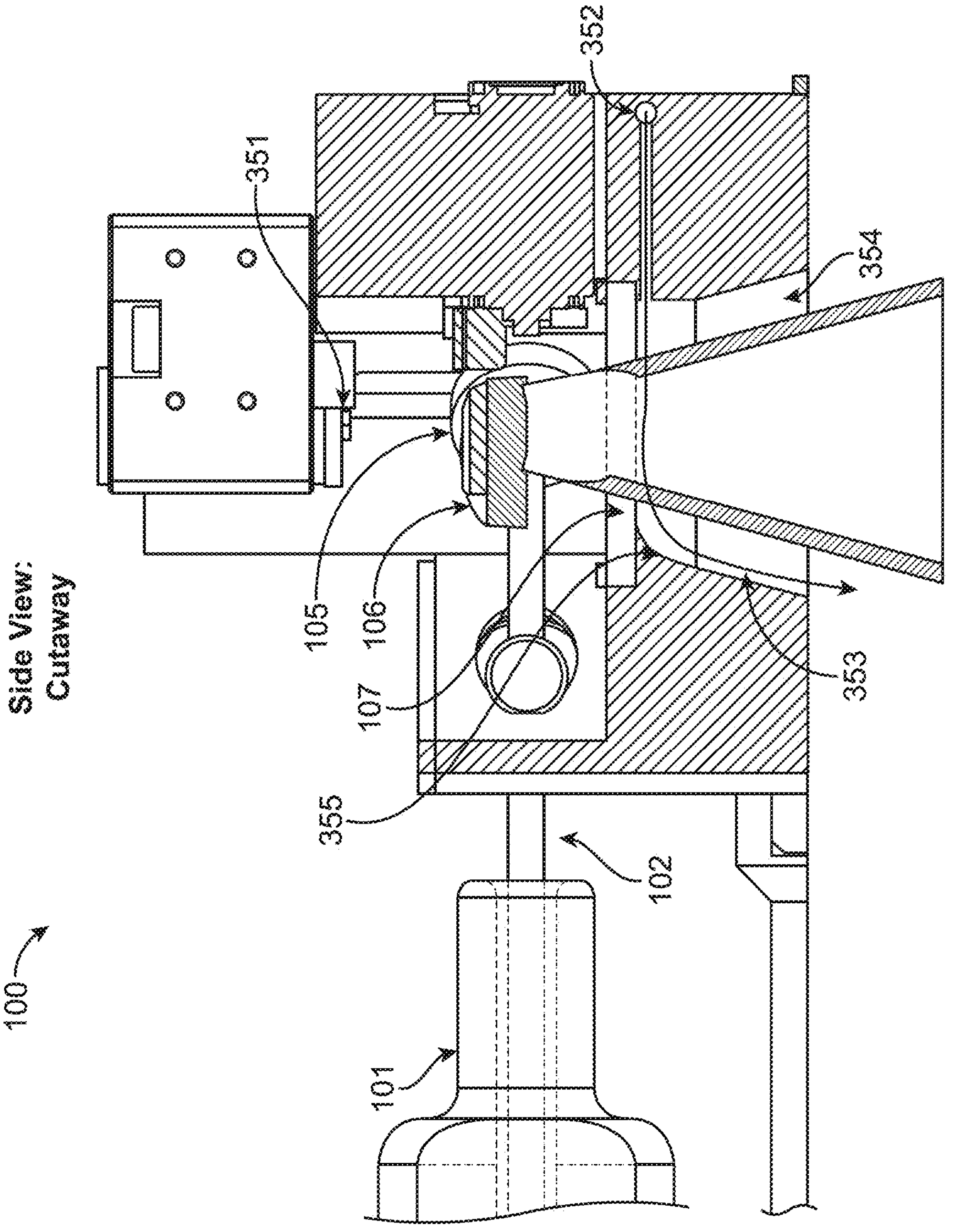
FIG. 3 illustrates a side view cutaway of a laser optical system with the clean air path indicated, in accordance with one or more embodiments herein.

FIG. 3 shows a cross-sectional view of an embodiment of the optical control device disclosed herein. FIG. 3 illustrates a mechanism for preventing dust and debris accumulation on the optical elements of the optical control device 100 shown in FIG. 1 and FIG. 2. In some embodiments, the optical elements may comprise hard stops 351 on mirrors to prevent the beam from hitting regions of the optical control device outside of a predefined boundary on the surface. The optical elements, for example the beam combining element 103 and one or both of the reflective elements, such as the first reflective element 105 and the second reflective element 106, may be protected by an enclosure. The optical elements may be surrounded by the enclosure. In some embodiments, the enclosure is sealed to prevent dust, debris, water, or any combination thereof from contacting the optical elements.

The enclosure may comprise a laser escape window 107, as shown in FIG. 3. In some embodiments, the laser escape window 107 is positioned to intersect the beam after the second reflective element 106 in the beam path, such as laser path 102, or the laser escape window 107 is positioned to intersect the beam after the first reflective element 105 in the beam path. In some embodiments, the laser escape window 107 is the last element in the beam path. The laser escape window 107 may prevent dust, debris, water, or any combination thereof from reaching the optical elements. In some embodiments, the laser escape window 107 comprises a material that is substantially transparent to electromagnetic radiation, such as light. For example, the laser escape window 107 may comprise glass, quartz, fused silica, zinc selenide, a transparent polymer, or a combination thereof.

The enclosure may further comprise a self-cleaning device configured to prevent accumulation of dust or debris on the surface of the laser escape window 107 or to remove dust or debris that has accumulated on the surface of the laser escape window 107. In some embodiments, the self-cleaning device comprises an aperture 352 in an external surface of the enclosure configured to discharge clean air in an air stream 353. The clean air stream 353 may prevent debris from damaging the laser escape window 107. In some embodiments, the clean air may be filtered. The aperture 352 may be configured to direct an air stream 353 toward an exterior surface of the escape window. The aperture 352 may be configured such that the clean air is directed across the surface of the laser escape window 107. In some embodiments, the enclosure is configured to guide the clean air stream 353 without obstructing the beam path 102. For example, the enclosure may comprise an opening 354 after the laser escape window 107 in the beam path having clearance such that the beam may pass unobstructed. In some embodiments, the opening comprises a wall opposite the aperture 352. The wall may be configured to control the direction of the air stream 353 and reduce turbulent flow without obstructing the beam. The opening may encompass the laser escape window 107 and the beam path 102 and may be configured so that the opening is narrower close to the laser escape window 107 and wider farther from the laser escape window 107 in the direction of the beam path 102. In some embodiments, the opening has smooth corners 355 to allow passage of the clean air while preventing turbulent flow.

Figure 4B:
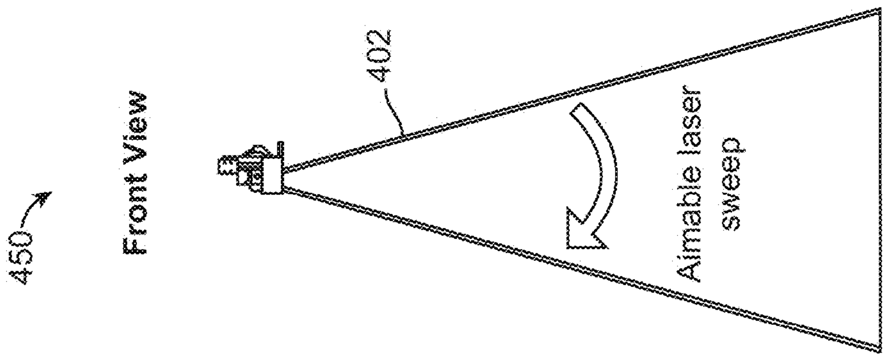
FIG. 4B illustrates a front view of a targeting laser and targeting coverage area of the targeting laser, in accordance with one or more embodiments herein.
Figure 4A:
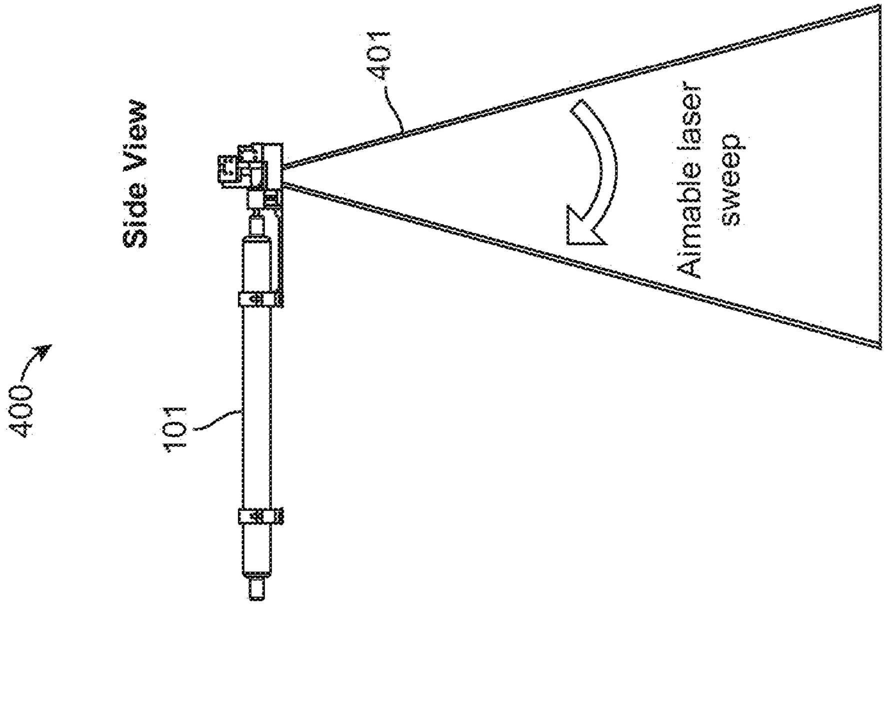
FIG. 4A illustrates a side view of a targeting laser and targeting coverage area of the targeting laser, in accordance with one or more embodiments herein.

After exiting the optical control system 100, the beam may be directed along beam path 102 toward a surface, as shown in FIG. 4A and FIG. 4B. In some embodiments, the surface contains an object of interest, for example a weed. Rotational motions of one or both of the reflective elements 105 and 106, as shown in FIG. 2, may produce a laser sweep along a first translational axis 401 and a laser sweep along a second translational axis 402, as show in view 400 and 450 of FIG. 4A and FIG. 4B, respectively. The rotational motions of one or both of the reflective elements 105 and 106 may control the location at which the beam encounters the surface. For example, the rotation motions of one or both of the reflective elements 105 and 106 may move the location at which the beam encounters the surface to a position of an object of interest on the surface. In some embodiments, the beam is configured to damage the object of interest. For example, the beam may comprise electromagnetic radiation, and the beam may irradiate the object. In another example, the beam may comprise infrared light, and the beam may burn the object. In some embodiments, one or both of the reflective elements may be rotated such that the beam scans an area surrounding and including the object.

A prediction camera or prediction sensor may coordinate with an optical control system, such as optical control system 100, to identify and locate objects to target. The prediction camera may have a field of view that encompasses a coverage area of the optical control system covered by amiable laser sweeps 401 and 402. The prediction camera may be configured to capture an image or representation of a region that includes the coverage area to identify and select an object to target. The selected object may be assigned to the optical control system. In some embodiments, the prediction camera field of view and the coverage area of the optical control system may be temporally separated such that prediction camera field of view encompasses the target at a first time and the optical control system coverage area encompasses the target at a second time. Optionally, the prediction camera, the optical control system, or both may move with respect to the target between the first time and the second time.

Figure 5:
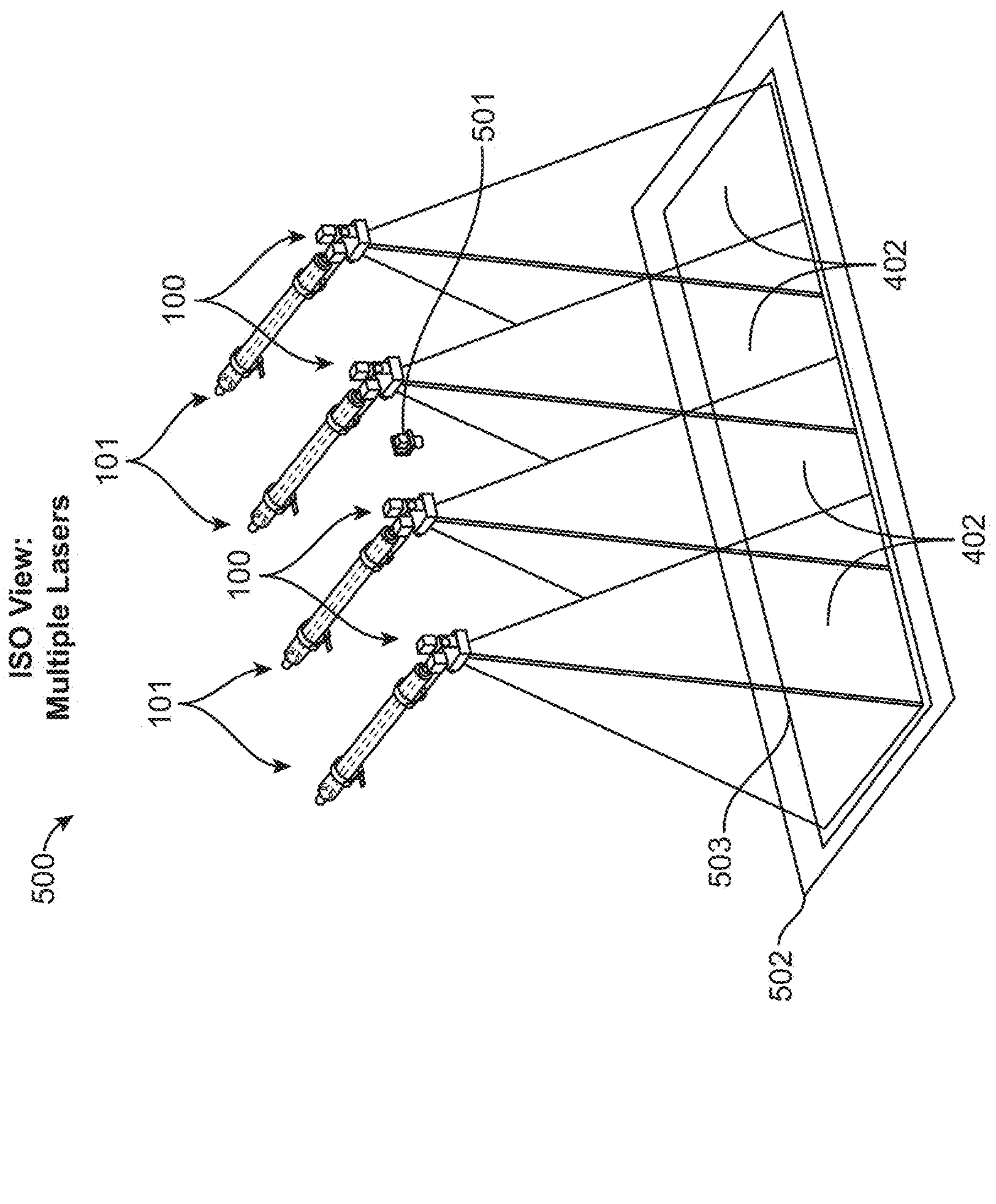
FIG. 5 illustrates an isometric view of a prediction camera, multiple targeting lasers, prediction view area of the prediction camera, and targeting coverage area of the targeting lasers, in accordance with one or more embodiments herein.

In some embodiments, a plurality of optical control systems may be combined to increase a coverage area on a surface. FIG. 5 illustrates a compound system 500 comprising a plurality of optical control systems 100. The plurality of optical control systems is configured such that the laser sweep along a translational axis 402 of each optical control system overlaps with the laser sweep along the translational axis of the neighboring optical control system. The combined laser sweep 401 and 402 defines a coverage area 503 that may be reached by at least one beam of a plurality of beams from the plurality of optical control systems. A prediction camera 501 may be positioned such that a prediction camera field of view 502 fully encompasses the coverage area 503. In some embodiments, a detection system may comprise two or more prediction cameras, each having a field of view. The fields of view of the prediction cameras may be combined to form a prediction field of view that fully encompass the coverage area. In some embodiments, the prediction field of view does not fully encompass the coverage area at a single time point but may encompass the coverage area over two or more time points (e.g., image frames). Optionally, the prediction camera or cameras may move relative to the coverage area over the course of the two or more time points, enabling temporal coverage of the coverage area. The prediction camera or prediction sensor may be configured to capture an image or representation of a region that includes coverage area 503 to identify and select an object to target. The selected object may be assigned to one of the plurality of optical control systems based on the location of the object and the area covered by laser sweeps 401 and 402 of the individual optical control systems.

Figure 6:
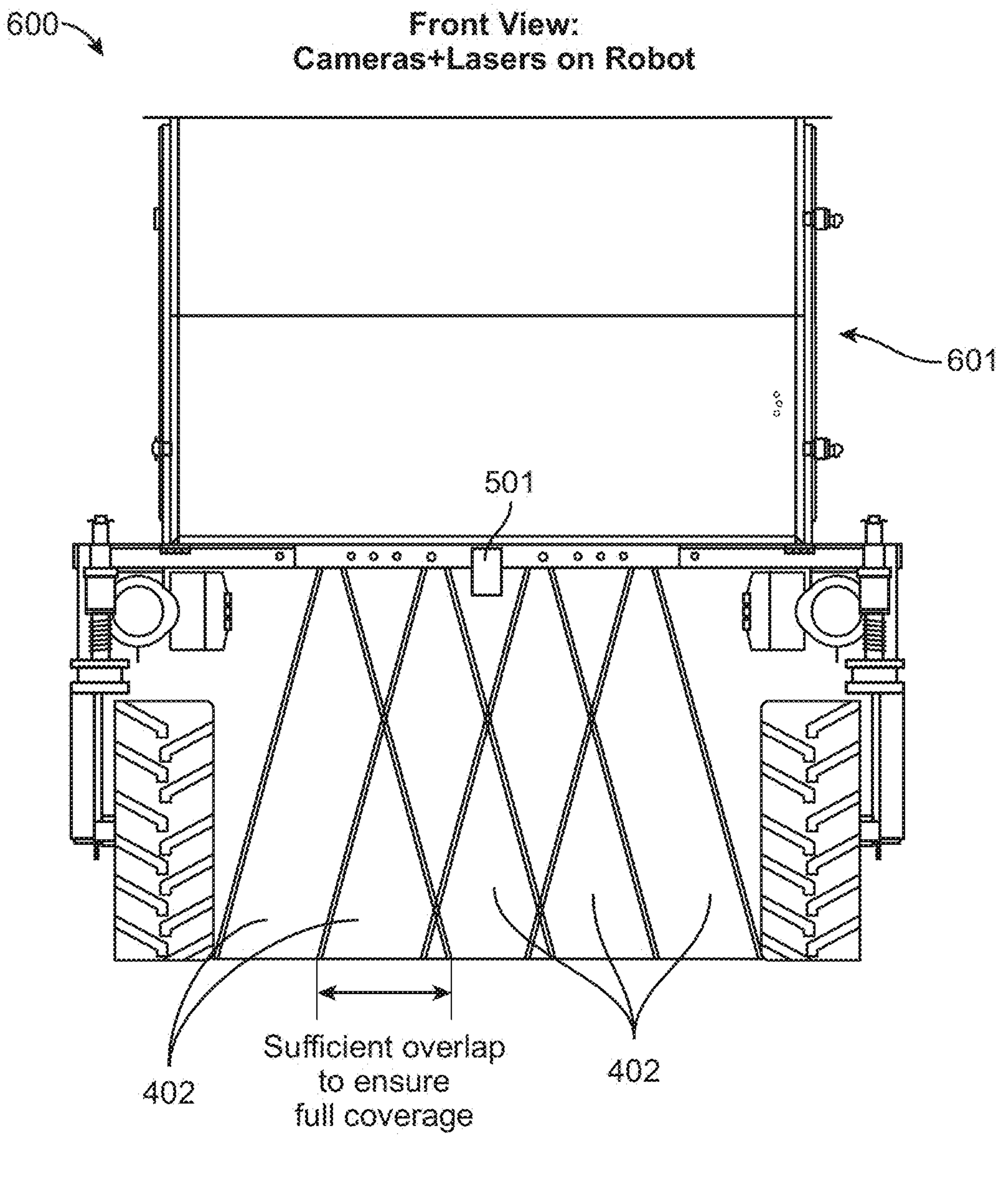
FIG. 6 illustrates a front view of an autonomous laser weed eradication robot, a prediction camera, and coverage area of multiple targeting lasers, in accordance with one or more embodiments herein.
Figure 7:
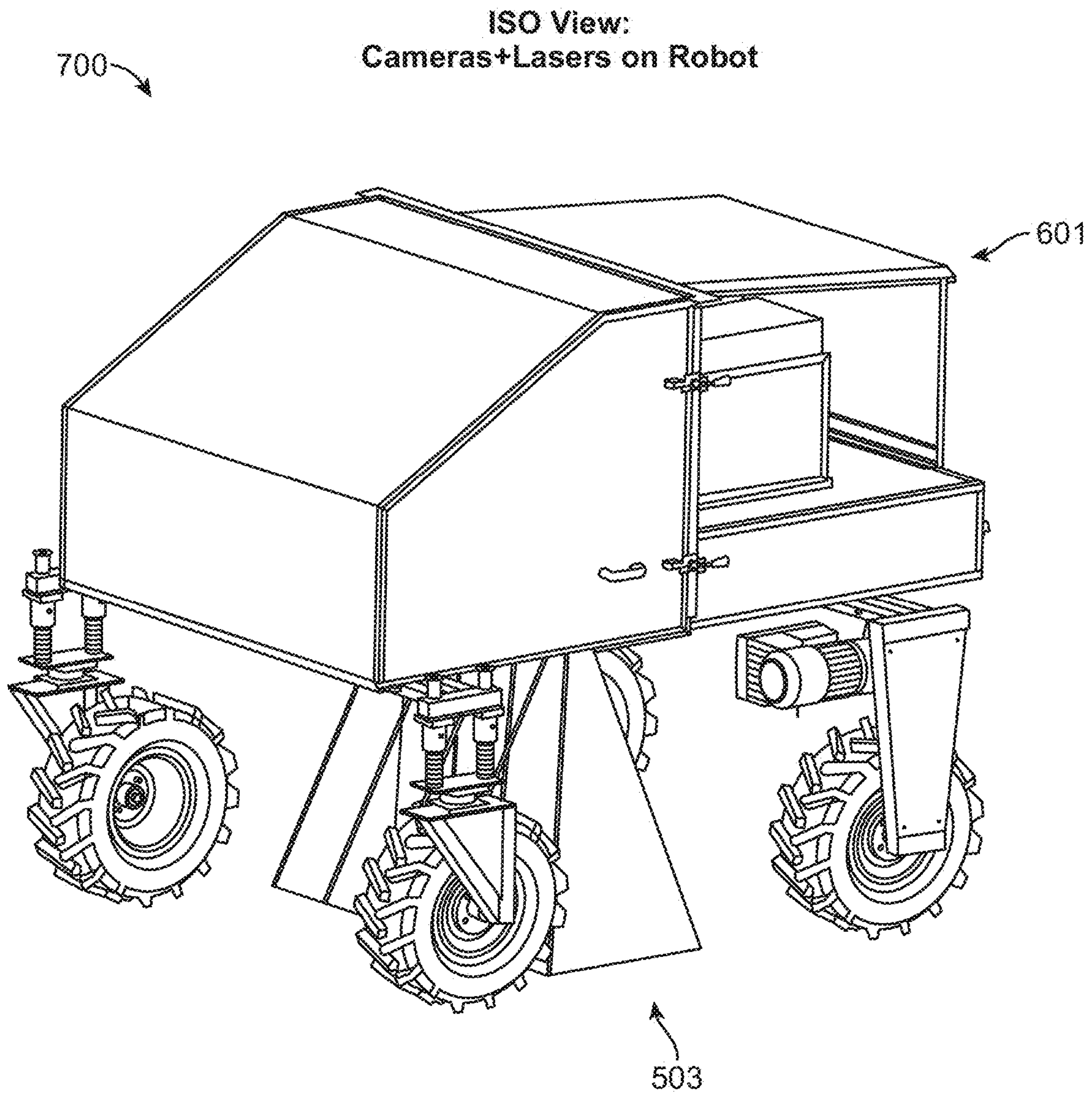
FIG. 7 illustrates an isometric view of an autonomous laser weed eradication robot, a prediction camera, and coverage area of multiple targeting lasers, in accordance with one or more embodiments herein.

The plurality of optical control systems may be configured on a vehicle 601, as shown in view 600 of FIG. 6 and in view 700 of FIG. 7. For example, the vehicle may be an autonomous vehicle. The autonomous vehicle may be a robot. In some embodiments, the vehicle may be controlled by a human. For example, the vehicle may be driven by a human driver. In some embodiments, the vehicle may be coupled to a second vehicle being driven by a human driver, for example towed behind or pushed by the second vehicle. The vehicle may be controlled by a human remotely, for example by remote control. In some embodiments, the vehicle may be controlled remotely via longwave signals, optical signals, satellite, or any other remote communication method. The plurality of optical control systems may be configured on the vehicle such that the coverage area overlaps with a surface underneath, behind, in front of, or surrounding the vehicle.

The vehicle 601 may be configured to navigate a surface containing a plurality of objects, including one or more objects of interest, for example a crop field containing a plurality of plants and one or more weeds. The vehicle 601 may comprise one or more of a plurality of wheels, a power source, a motor, a prediction camera 501, or any combination thereof. In some embodiments, the vehicle 601 has sufficient clearance above the surface to drive over a plant, for example a crop, without damaging the plant. In some embodiments, a space between an inside edge of a left wheel and an inside edge of a right wheel is wide enough to pass over a row of plants without damaging the plants. In some embodiments, a distance between an outside edge of a left wheel and an outside edge of a right wheel is narrow enough to allow the vehicle to pass between two rows of plants, for example two rows of crops, without damaging the plants. In one embodiment, the vehicle comprising the plurality of wheels, the plurality of optical control systems, and the prediction camera may navigate rows of crops and emit a beam of the plurality of beams toward a target, for example a weed, thereby burning or irradiating the weed.

Autonomous Weed Eradication Systems

The methods described herein may be implemented by an autonomous weed eradication system to target and eliminate weeds. For example, an autonomous weed eradication system may be used to target a weed of interest identified in an image or representation collected by a first sensor, such as a prediction sensor, and locate the same weed in an image or representation collected by a second sensor, such as a targeting sensor. In some embodiments, the first sensor is a prediction camera and the second sensor is a targeting camera. Targeting the weed may comprise precisely locating the weed using the targeting sensor, targeting the weed with a laser, and eradicating the weed by burning it with laser light, such as infrared light. The prediction sensor may be part of a prediction module configured to determine a predicted location of an object of interest, and the targeting sensor may be part of a targeting module configured to refine the predicted location of the object of interest to determine a target location and target the object of interest with the laser at the target location. The prediction module may be configured to communicate with the targeting module to coordinate a camera handoff using point-to-point targeting, as described herein.

Prediction Modules

Figure 8:
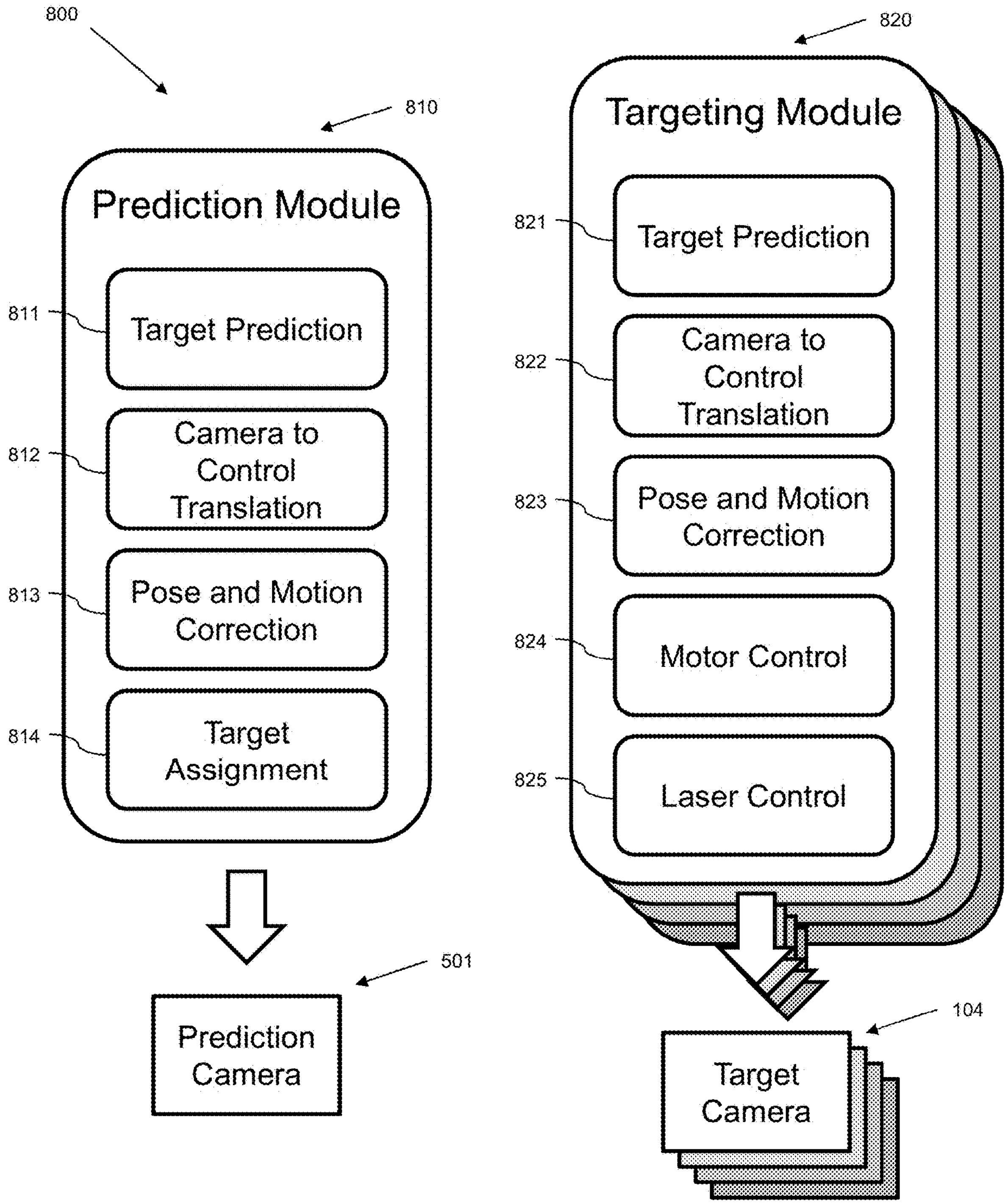
FIG. 8 depicts a method of identifying, assigning, and targeting an object, in accordance with one or more embodiments herein.

A prediction module of the present disclosure may be configured to locate objects on a surface. FIG. 8 illustrates a prediction module 810 configured to identify, assign, and target an object of interest. In some embodiments, a target prediction system 811 is configured to capture an image of a region of a surface using the prediction camera 501 or prediction sensor, identify an object of interest in the image, and determine a predicted location of the object.

The target prediction system 811 may include an object identification module configured to identify an object of interest and differentiate the object of interest from other objects in the prediction image. In some embodiments, the target prediction 811 system uses a machine learning model to identify and differentiate objects based on features extracted from a training dataset comprising labeled images of objects. For example, the target prediction system 811 may be trained to identify weeds and differentiate weeds from other plants, such as crops. In another example, the target prediction system 811 may be trained to identify debris and differentiate debris from other objects. The object identification module may be configured to identify a plant and to differentiate between different plants, such as between a crop and a weed. In some embodiments, the machine learning model may be a deep learning model, such as a deep learning neural network.

In some embodiments, the object identification module comprises using an identification machine learning model, such as a convolutional neural network. The identification machine learning model may be trained with many images, such as high-resolution images, for example of surfaces with or without objects of interest. For example, the machine learning model may be trained with images of fields with or without weeds. Once trained, the machine learning model may be configured to identify a region in the image containing an object of interest. The region may be defined by a polygon, for example a rectangle. In some embodiments, the region is a bounding box. In some embodiments, the region is a polygon mask covering an identified region. In some embodiments, the identification machine learning model may be trained to determine a location of the object of interest, for example a pixel location within a prediction image.

A camera to control translation system 812 may be configured to translate the location of the object in the prediction image into a location on the surface or a surface location relative to a detection system frame of reference. For example, the camera to control translation system 812 may build multiple interpolation functions which provide a translation from the location in the prediction image to one or more actuator positions, for example pan and tilt positions, of one or more actuators controlling one or more reflective elements, such as reflective elements 105 and 106 of optical control system 100 shown in FIG. 1-FIG. 3.

The prediction module 810 shown in FIG. 8 may further comprise a pose and motion correction system 813. The pose and motion correction system 813 may comprise a positioning system, for example a wheel encoder or rotary encoder, an Inertial Measurement Unit (IMU), a Global Positioning System (GPS), a ranging sensor (e.g., laser, SONAR, or RADAR), or an Internal Navigation System (INS). The pose and motion correction system may utilize an Inertial Measurement Unit (IMU) which may be directly or indirectly coupled to the prediction sensor. For example, the prediction sensor and the IMU may be mounted to a vehicle. The IMU may collect motion readings of the IMU, and anything directly or indirectly coupled to the IMU, such as the prediction sensor. For example, the IMU may collect readings comprising three-dimensional acceleration and three-dimensional rotation information which may be used to determine a magnitude and a direction of motion over an elapsed time. The pose and motion correction system may comprise a Global Positioning System (GPS). The GPS may be directly or indirectly coupled to a prediction sensor of a prediction module or a targeting sensor of a targeting module. For example, the GPS may communicate with a satellite-based radio-navigation system to measure a first position of the prediction sensor at a first time and a second position of the prediction sensor at a second time. The pose and motion correction system may comprise a wheel encoder in communication with a wheel of the vehicle. The wheel encoder may estimate a velocity or a distance traveled based on angular frequency, rotational frequency, rotation angle, or number of wheel rotations. In some embodiments, the positioning system and the detection system may be positioned on a vehicle. Alternatively or in addition, the positioning system may be positioned on a vehicle that is spatially coupled to the detection system. For example, the positioning system may be located on a vehicle pulling the detection system.

The pose and motion correction system 813 may comprise an Internal Navigation System (INS). The INS may be directly or indirectly coupled to the targeting sensor. For example, the INS may comprise motion sensors, for example accelerometers, and rotation sensors, for example gyroscopes, to measure the position, the orientation, and the velocity of the targeting camera. The pose and portion correction system 813 may or may not use external references to determine a change in position of the targeting sensor. The pose and motion correction system may determine a change in position of the targeting sensor from the first position and the second position. In some embodiments, after the target prediction system locates an object of interest in an image, the pose and motion correction system 813 determines an amount of time that has elapsed since the image was captured and the magnitude and direction of motion of the prediction camera that has occurred during the elapsed time. The pose and motion correction system 813 may integrate the object location, time elapsed, and magnitude and direction of motion to determine an adjusted location of the object on the surface.

Based on the location of the object, a target assignment system 814 may assign the object to a targeting module 820. In some embodiments, the targeting module may be one of a plurality of targeting modules. The prediction module 810 may send the predicted location of the object of interest to the assigned targeting module 820. The predicted location of the object may be adjusted based on a magnitude and direction of motion during an elapsed time, or the location may be within a region defined by a polygon, or both. A future predicted object location may be determined based on a predicted magnitude and direction of motion during a future time period. The target assignment module 814 may assign the target to the targeting module having a coverage area that overlaps with the predicted location, the adjusted predicted location, or the future predicted location.

The prediction module 810 may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to detect and identify a target. The prediction sensor should provide images of sufficient resolution on which to perform operations to detect and identify an object. In some embodiments, the prediction sensor may be a camera, such as a charge-coupled device (CCD) camera or a complementary metal-oxide-semiconductor (CMOS) camera, a LIDAR detector, an infrared sensor, an ultraviolet sensor, an x-ray detector, or any other sensor capable of generating an image.

Targeting Modules

A targeting module 820 of the present disclosure may be configured to target an object identified by a prediction module 810. In some embodiments, the targeting module may direct an implement toward the object to manipulate the object. For example, the targeting module 820 may be configured to direct a laser beam toward a weed to burn the weed. In another example, the targeting module 820 may be configured to direct a grabbing tool to grab the object. In another example, the targeting module may direct a spraying tool to spray fluid at the object. In some embodiments, the object may be a weed, a plant, a field, a piece of debris, an obstruction, a region of a surface, or any other object that may be manipulated. FIG. 8 illustrates a targeting module 820 configured to receive a predicted location of an object of interest from the prediction module 810 and point the target camera 104 or targeting sensor toward the predicted location. In some embodiments, the targeting module 820 may direct an implement, such as a laser, toward the predicted location. In the illustrated embodiments of FIG. 8, the position of the targeting sensor and the position of the implement may be coupled. In some embodiments, a plurality of targeting modules 820 are in communication with the prediction module 810.

A targeting module 820 may include and communicate with an optical control system as described herein. For example, as shown for optical control system 100 in FIG. 1-FIG. 3, the targeting module may comprise an emitter 101 that emits a beam along an optical path, such as laser path 102, and a beam combining element 103, a targeting camera 104, a first reflective element 105 configured to deflect the beam controlled by a first actuator, and optionally, a second reflective element 106 configured to deflect the beam controlled by a second actuator, positioned in the optical path. One or both of the actuators may be configured to rotate the one or both of reflective elements 105 or 106 about a first axis of rotation, and optionally a second axis of rotation, thereby changing the deflection of the beam path and translating a position at which the beam encounters a surface along a first translational axis, and optionally, along a second translational axis. In some embodiments, the first actuator and the second actuator may rotate a single reflective element about a first axis of rotation and a second axis of rotation, providing translation of the position of the point at which the beam encounters the surface along a first translational axis and a second translational axis. In some embodiments, the first reflective element 105, the second reflective element 106, or both also control the direction of the targeting camera 104 or targeting sensor.

As shown in FIG. 8, a target prediction system 821 may receive the predicted location of the object of interest from the prediction module 810 and may point the target camera 104 or targeting sensor toward the predicted location of the object. The target camera 104 or targeting sensor may collect a targeting image of a region predicted to contain the object of interest. In some embodiments, the targeting module 820 includes an object matching module configured to determine whether the targeting image contains the object of interest identified by the prediction module, thereby coordinating a camera handoff using point-to-point targeting. The object matching module may account for differences in the appearance of the object in the prediction image and the targeting image due to differences between the prediction sensor and the targeting sensor, such as sensor type, resolution, magnification, field of view, or color balance and sensitivity, differences in imaging angle or position, movement of the detection system, variability of non-planar surfaces, differences in imaging frequency, or changes in the object between when the prediction image was collected and when the targeting image was collected. In some embodiments, the object matching module may account for distortions introduced by the optical system, such as lens distortions, distortions from ZnSe optics, spherical aberrations, or chromatic aberration.

In some embodiments, the object matching module may use an object matching machine learning module trained to identify the same object in different images, accounting for differences between the two images, for example, due to differences in the image sensors, such as sensor type, resolution, magnification, field of view, or color balance and sensitivity, differences in imaging angle or position, movement of the detection system, variability of non-planar surfaces, or changes in the object between when the two images were collected.

If the object matching module identifies the object of interest in the targeting image, the object matching module may determine the target location of the object. The object matching module may determine an offset between the predicted position of the object and the target location of the object. The camera to control translation system 822 may adjust the direction of the targeting sensor, such as targeting camera 104, based on the offset, for example by adjusting a position of the first reflective element 105, and optionally, a position of the second reflective element 106. The positions of the reflective elements may be controlled by actuators, as described herein. For example, the camera to control translation system 822 may convert the pixel location of the target in a targeting image into pan or tilt values of one or both actuators corresponding to mirror positions predicted to deflect the beam to the target location. In some embodiments, the position of an implement, such as a laser, is adjusted to direct the implement toward the target location of the object. In some embodiments, movement of the targeting sensor and the implement are coupled. If the object matching module does not identify the object of interest in the targeting image, the camera to control translation system may adjust the position of the targeting sensor and collect a second targeting image. Alternatively or in addition, if the object matching module does not identify the object of interest in the targeting image, a different object may be selected from the prediction image, and a new predicted location may be determined. Reasons that the object matching module may fail to identify the object of interest in the target image may include inadequate motion correction or obstruction of the object in the targeting image.

The target location of the object may be further corrected using the pose and motion correction system 823. The pose and motion correction system 823 may use a positioning system, for example a wheel encoder, an IMU, a GPS, a ranging sensor, or an INS, to determine a magnitude and direction of motion of the targeting camera. In some embodiments, acceleration and rotation readings from an IMU coupled directly or indirectly to the targeting sensor are used to determine a magnitude and direction of motion. For example, the targeting sensor and the IMU may be mounted to a vehicle. The IMU may collect motion readings of the IMU, and anything directly or indirectly coupled to the IMU, such as the targeting sensor. For example, the IMU may collect readings comprising three-dimensional acceleration and three-dimensional rotation information which may be used to determine a magnitude and a direction of motion over an elapsed time. In some embodiments, the pose and motion correction system may use a wheel encoder to determine a distance and velocity of motion of the targeting sensor, such as target camera 104. In some embodiments, the pose and motion correction system may use GPS to determine a magnitude and direction of motion of the targeting sensor, such as target camera 104. The wheel encoder may estimate a velocity or a distance traveled based on angular frequency, rotational frequency, rotation angle, or number of wheel rotations. The velocity or distance traveled may be used to determine the position of a vehicle, such as a vehicle directly or indirectly coupled to the targeting sensor, relative to a surface. In some embodiments, the positioning system and the detection system may be positioned on a vehicle. Alternatively or in addition, the positioning system may be positioned on a vehicle that is spatially coupled to the detection system. For example, the positioning system may be located on a vehicle pulling the detection system.

For example, the GPS may be mounted to the vehicle. The GPS may communicate with a satellite-based radio-navigation system to measure a first position of the targeting sensor, such as targeting camera 104 at a first time and a second position of the targeting sensor at a second time. In some embodiments, the pose and motion correction system 823 may use an INS to determine the magnitude and direction of motion of the targeting sensor. For example, the INS may measure the position, the orientation, and the velocity of the targeting sensor. In some embodiments, after the target prediction system 821 locates an object of interest in an image, the pose and motion correction system 823 determines an amount of time that has elapsed since the image was captured and the magnitude and direction of motion of the targeting sensor that has occurred during the elapsed time. The pose and motion correction system 823 may integrate the object location, time elapsed, and magnitude and direction of motion to determine a corrected target location of the object. In some embodiments, the positioning system used by the pose and motion correction system of the targeting module 823 and the positioning system used by the pose and motion correction system of the prediction module 813 are the same. A future target location of the object may be determined based on a predicted magnitude and direction of motion during a future time period. In some embodiments, the positioning system used by the pose and motion correction system 823 of the targeting module 820 and the positioning system used by the pose and motion correction system 823 of the prediction module are different.

The motor control system 824 may comprise software-driven electrical components capable of providing signals the first actuator, and optionally the second actuator, controlling the position, orientation, or direction of the targeting sensor, such as targeting camera 104, the implement, such as a laser, or both. In some embodiments, the actuators may control a first reflective element 105, and optionally a second reflective element 106. For example, the actuator control system may send a signal comprising actuator pan tilt values to the first actuator and the second actuator. The actuators may adopt the signaled pan tilt positions and move the first reflective element 105 and the second reflective element 106 around a first rotational axis and a second rotational axis to positions such that a beam emitted by the laser is deflected to the target location of the object, the corrected target location of the object, or the future target location of the object.

The targeting module 820 may comprise an implement control system. In some embodiments, the implement control system may be a laser control system 825. The implement control system, such as the laser control system 825, may comprise software-driven electrical components capable of controlling activation and deactivation of the implement. Activation or deactivation may depend on the presence or absence of an object as detected by the targeting camera 104. Activation or deactivation may depend on the position of the implement relative to the target object location. In some embodiments, the implement control system may activate the implement, such as a laser emitter, when an object is identified and located by the target prediction system. In some embodiments, the implement control system may activate the implement when the range of the implement, such as the beam path 102, is positioned to overlap with the target object location. In some embodiments, the implement control system may activate the implement when the range of the implement is within a region of the surface containing an object defined by a polygon, for example a bounding box or a polygon mask covering the identified region.

The implement control system may deactivate the implement once the object has been manipulated, such as grabbed, sprayed, burned, or irradiated; the region comprising the object has been targeted with the implement; the object is no longer identified by the target prediction module; a designated period of time has elapsed; or any combination thereof. For example, the laser control system 825 may deactivate the emitter once a region on the surface comprising a weed has been scanned by the beam, once the weed has been irradiated or burned, or once the beam has been activated for a pre-determined period of time.

The prediction modules and the targeting modules described herein may be used in combination to locate, identify, and target an object with an implement. The targeting control module may comprise an optical control system as described herein. The prediction module and the targeting module may be in communication, for example electrical or digital communication. In some embodiments, the prediction module and the targeting module are directly or indirectly coupled. For example, the prediction module and the targeting module may be coupled to a support structure. In some embodiments, the prediction module and the targeting module are configured on a vehicle, for example the vehicle 601, as shown in FIG. 6 and FIG. 7.

The targeting module may comprise a system controller, for example a system computer having storage, random access memory (RAM), a central processing unit (CPU), and a graphics processing unit (GPU). The system computer may comprise a tensor processing unit (TPU). The system computer should comprise sufficient RAM, storage space, CPU power, and GPU power to perform operations to detect and identify a target. The targeting sensor should provide images of sufficient resolution on which to perform operations to match an object to an object identified in a prediction image.

Weed Targeting and Eradication

Figure 9:
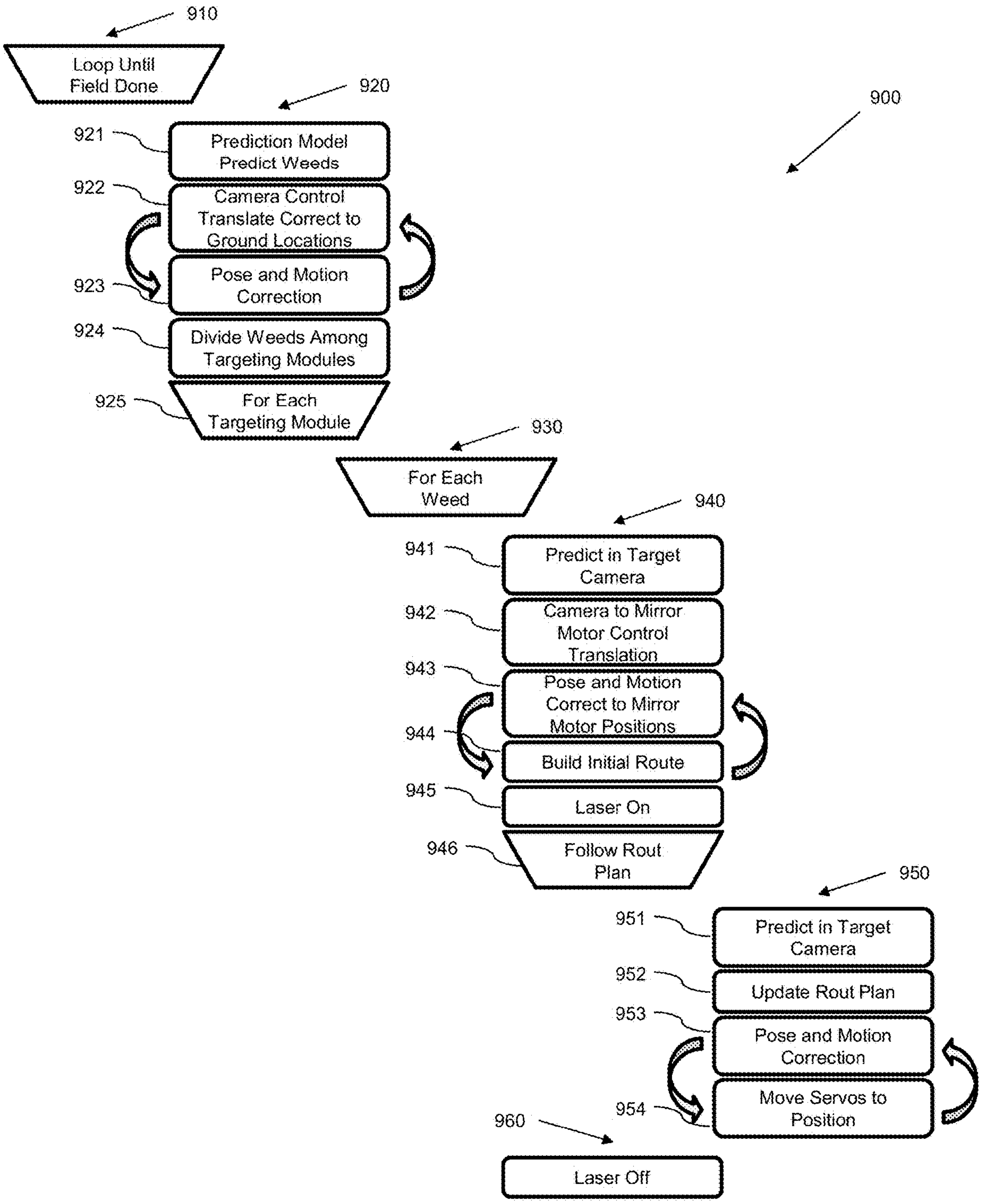
FIG. 9 depicts a method of identifying, assigning, targeting, and eradicating weeds in a field, in accordance with one or more embodiments herein.

FIG. 9 illustrates a process 900 for an embodiment of the devices and methods disclosed herein. The following example is illustrative and non-limiting to the scope of the devices, systems, and methods described herein. The process comprises identifying, assigning, matching, targeting, and eradicating weeds in a field. In this example, a weed eradication system comprises a prediction module 810 in communication with a plurality of targeting modules 820. The prediction module 810 and the targeting module 820 are controlled by a system controller, for example a computer comprising storage, RAM, CPU, and GPU. Each targeting module comprises an optical control system 100, as shown in FIG. 1-FIG. 3. The prediction module and the targeting modules are coupled to a solid support. The solid support is positioned on a vehicle 601, as shown in FIG. 6 and FIG. 7.

As shown in FIG. 9, operations 920, 930, 940, 950, and 960 are iterated until a field of interest, for example an agricultural field containing crops, has been completely scanned 910, or until another end point is reached. First, the prediction module runs operation 920. The prediction camera 501 collects an image of a field surface in an area surrounding or in front of the vehicle 601. The system controller processes the image and identifies weeds in the image, for example using an object identification machine learning model. At step 921, the prediction model predicts the location of one or more weeds identified in the image using the methods described herein. The camera to control translation system 812 translates a pixel coordinate of a weed in the image to a ground location at step 922. At step 923, the system controller instructs the prediction module to update the predicted location based on motion of the vehicle 601, for example as measured by a wheel encoder, an IMU, a ranging sensor, or a GPS, at 922. Each one of the one or more weeds is assigned to a targeting module at step 924 based on the ground location of the weed and a coverage area of the targeting module 820.

Operations 930, 940, 950, and 960 are iterated for each target module at step 925. Operations 940, 950, and 960 are iterated for each weed. A targeting module 820 of the plurality of targeting modules runs operation 940. Actuator pan and tilt values of the mirrors controlling reflective elements controlling the field of view of the targeting camera 104 may be set based on the predicted location of the weed determined by the prediction system 810 to point toward the predicted location of the weed. The targeting camera 104 captures a targeting image of the field, and the system controller identifies the weed in the targeting image at step 941. Identification of the weed may comprise matching an object identified in the targeting image to the object of interest identified in the prediction image, for example, using the object matching machine learning models described herein. In some embodiments, a machine learning model may be a deep learning model, such as a deep learning neural network.

The targeting system may determine a target location of the weed based on the object matching module. The targeting system determines an offset between the predicted location of the weed and the target location of the weed. The system controller translates the offset into pan and tilt values for each actuator controlling each reflective element in an optical control system controlled by targeting module at step 942 and directs the targeting camera 104 and the laser to point toward the target location of the weed. The system controller applies a pose and motion correction to the actuator pan and tilt values based on motion of the vehicle, for example as measured by the wheel encoder, the IMU, the ranging sensor, or the GPS, at 943 and plans a route for an emitted beam path controlled by the actuator pan and tilt positions at 944. Once the actuators reach a determined position, an emitter is activated at 945.

Operation 950 is repeated while the planned route is implemented 946. The weed is identified in an image 951 collected by the targeting camera 104, and the route plan is updated based on an observed position of the weed 952. The system controller applies a pose and motion correction to the actuator pan and tilt values based on motion of the vehicle measured by the wheel encoder, the IMU, or the GPS at 953. The actuators are moved into position based on the updated route plan 954. Once the planned route has been completed the emitter is deactivated 960.

Detection Systems for Object Identification and Point-to-Point Targeting

In some embodiments, a detection system of the present disclosure, comprising a prediction system and a targeting system, may be configured to identify and target an object using point-to-point targeting methods. The prediction system may comprise a prediction sensor configured to image a region of interest, and the targeting system may comprise a targeting sensor configured to image a portion of the region of interest. Imaging may comprise collecting a representation (e.g., an image) of the region of interest or the portion of the region of interest.

Figure 10A:
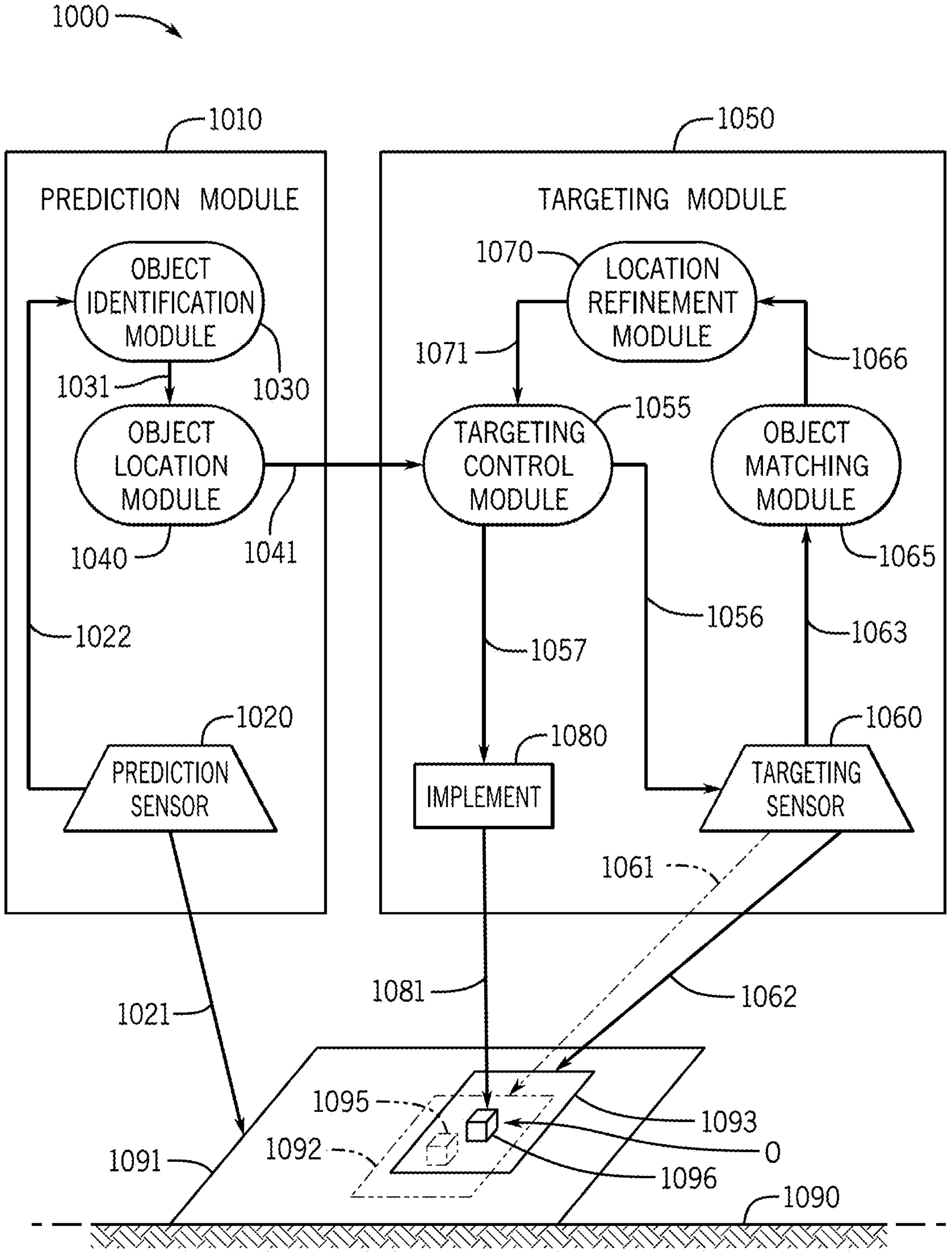
FIG. 10A depicts a system for identifying, locating, targeting, and manipulating an object, in accordance with one or more embodiments herein.

FIG. 10A schematically depicts a detection system 1000 that may be used in a method to identify, locate, and precisely target an object of interest O. In some embodiments, a detection system may include an optical control system, for example optical control system 100 depicted in FIG. 1-FIG. 3, as described herein. A detection system 1000, comprising a prediction module 1010 and a targeting module 1050, may image a region of interest 1091 using a prediction sensor 1020 via line 1021. The region of interest 1091 may be a region of a surface 1090, such as the ground, a floor, or an agricultural field. The image may be a visible light image, an infrared image, an ultraviolet image, a light detection and ranging (LIDAR) image, an x-ray image, or any other electromagnetic image. The prediction sensor 1020 may be a camera, such as a charge-coupled device (CCD) camera or a complementary metal-oxide-semiconductor (CMOS) camera, a LIDAR detector, an infrared sensor, an ultraviolet sensor, an x-ray detector, or any other sensor capable of detecting electromagnetic waves.

An object identification module 1030 may receive the prediction image from the prediction sensor 1020 via line 1022. The prediction module 1010 may determine the presence or absence of an object of interest O in a prediction image of a region of interest 1091 collected by the prediction sensor 1020 using an object identification module 1030. The object identification module 1030 may identify objects of interest in the prediction image and may differentiate objects of interest from other objects in the prediction image. In some embodiments, the object identification module 1030 comprises an identification machine learning model trained to identify objects of interest based on features extracted from labeled images used for training the identification machine learning model. The machine learning model may be a deep learning model, such as a deep learning neural network. In some embodiments, the object identification module 1030 may implement a heuristic model, thresholding, or a classical detection algorithm to identify the object. In some embodiments, the object identification module identifies the object using spectroscopic data.

The identified object may be communicated to an object location module 1040 via line 1031. The object location module 1040 may determine an object predicted location 1095 of the object of interest O identified by the object identification module 1030. The object predicted location 1095 may be based on a location of the object of interest O within the region of interest 1091, such as a pixel location in the prediction image. In some embodiments, determining the object predicted location 1095 may comprise converting the pixel location to a location on a surface 1090 using a calibration model. In some embodiments, the calibration model may be a mathematical model, such as a trigonometric model, a geometric model, or a spline model. The calibration model may correlate a pixel location in the prediction image to a surface location, a targeting sensor position or orientation, an implement position, or a combination thereof. In some embodiments, the object location module 1040 may determine the object predicted location 1095 based on pre-determined calibration factors correlating a pixel location of the object O to a location on a surface. In some embodiments, the predicted location 1095 may account for movement of the detection system relative to the object between a time when the prediction image was collected and a time at which a targeting image will be collected.

The object location module 1040 may send the object predicted location 1095 to a targeting module 1050 via line 1041. In some embodiments, the targeting module 1050 is one of a plurality of targeting modules, and the targeting module 1050 may be selected based on availability of the targeting module or proximity of the targeting module to the object predicted location 1095.

A targeting control module 1055 of the targeting module 1050 may control the position, orientation, or direction of a targeting sensor 1060 via line 1056. In some embodiments, the targeting control module 1055 may control the position, orientation, or direction of the targeting sensor 1060 by moving an actuator that adjusts the position or orientation of the targeting sensor 1060. In some embodiments, the targeting control module 1055 may control the position, orientation, or direction of the targeting sensor 1060 by moving an actuator that adjusts the position or orientation of a reflective surface that directs electromagnetic waves to or from the targeting sensor 1060. The targeting control module 1055 may adjust the position, orientation, or direction of the targeting sensor 1060 based on the object predicted location 1095 using a calibration model. In some embodiments, the targeting control module 1055 may adjust the position, orientation, or direction of the targeting sensor 1060 based on pre-determined calibration factors correlating an object predicted location to a position of an actuator, such as an actuator that moves the targeting sensor or an actuator that moves a reflective surface that directs electromagnetic waves to or from the targeting sensor.

The targeting sensor 1060, the position, orientation, or direction of which may be adjusted by the targeting control module 1055 to point toward the object predicted location 1095, collects a targeting image of a predicted region 1092 predicted to contain the object of interest O via line 1061. The predicted region 1092 may cover a portion of the region of interest 1091 imaged by the prediction sensor 1020.

Figure 10B:
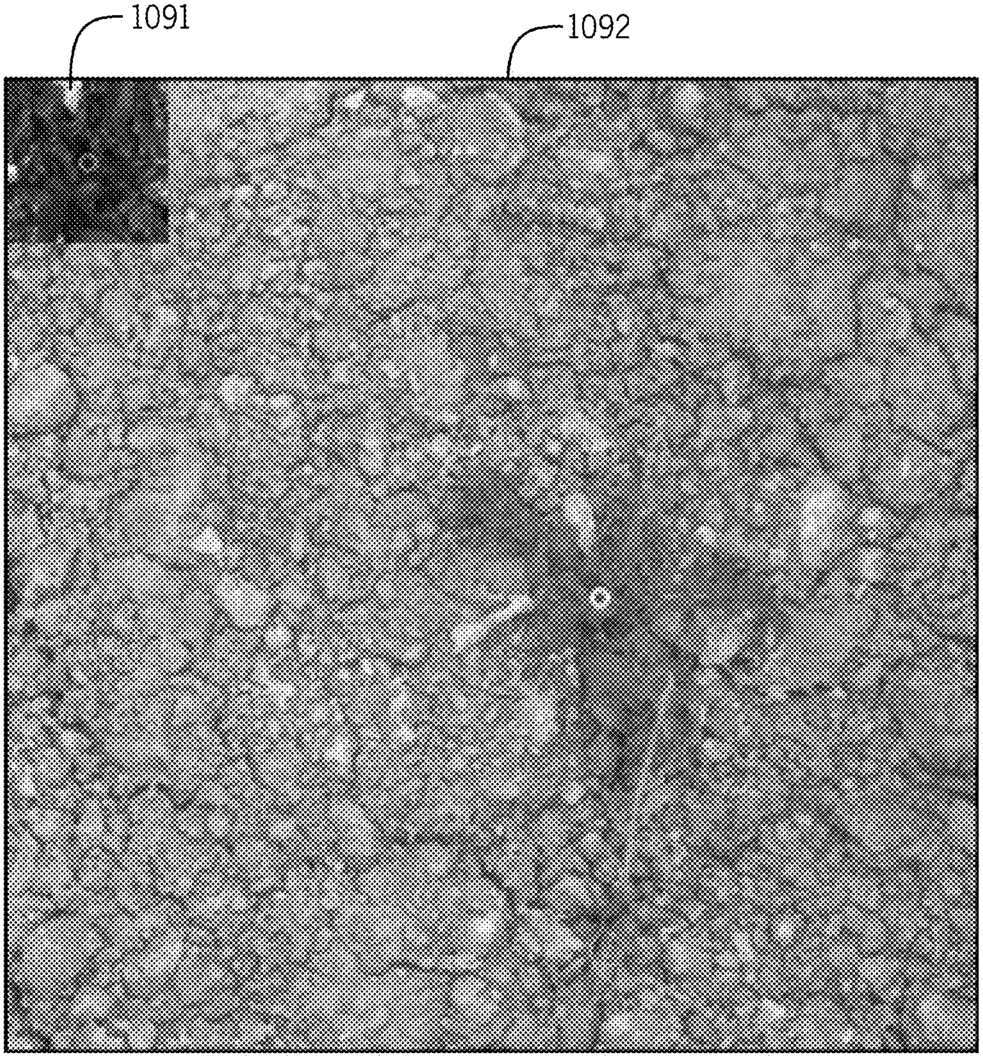
FIG. 10B illustrates a targeting image of a weed on a surface and a cropped region of a prediction image (inset) around the weed, in accordance with one or more embodiments herein.

FIG. 10B illustrates an example of a prediction image of a weed on a surface imaged using a wide field of view, for example a region of interest 1091 imaged using a prediction sensor, cropped around a weed of interest (inset), and a targeting image of the same weed imaged using a narrower field of view, for example a prediction region 1092 containing the object predicted location 1095, or a target region 1093 containing an object target location 1096. An object matching module 1065 of FIG. 10A may determine the presence or absence of the object of interest in a targeting image of the predicted region 1092 or the target region 1093, received from the targeting sensor 1060 via line 1063. In some embodiments, the object matching module 1065 comprises an object matching machine learning model trained to detect and match objects in the targeting image to objects identified in the prediction image. The object matching module 1065 may account for differences in the appearance of the object due to sensor differences, such as sensor type, resolution, magnification, field of view, or color balance and sensitivity, differences in imaging angle or position, movement of the detection system, variability of non-planar surfaces, or changes in the object between when the prediction image was collected and when the targeting image was collected.

If the object matching module 1065 does not locate the object of interest in the targeting image, the targeting control module 1055 may adjust the position, orientation, or direction of the targeting sensor, and the targeting sensor may collect a second targeting image. This process may be repeated until the object is located in the targeting image. Alternatively or in addition, if the object matching module 1065 does not locate the object of interest in the targeting image, a different object may be selected from the prediction image, and a new predicted location may be determined. Reasons that the object matching module 1065 may fail to identify the object of interest in the target image may include inadequate motion correction or obstruction of the object in the targeting image.

If the object matching module 1065 determines that the object of interest is present in the targeting image, a location refinement module 1070, in communication with the object matching module via line 1066, may determine an object target location 1096 of the object of interest O based on the location of the object in the targeting image. Determining the object target location may comprise converting a pixel location in the targeting image to a location on the surface 1090 using a calibration model. The calibration model may correlate a pixel location in the targeting image to a surface location, a targeting sensor position or orientation, an implement position, or a combination thereof. In some embodiments, the target location 1096 may account for movement of the detection system relative to the object between a time when the targeting image was collected and a time at which manipulation will be performed.

In some embodiments, the object matching module may determine an offset based on the target location. The offset may be an offset between a current actuator position and an actuator position to point the targeting sensor at the object target location 1096. The offset may be an offset between an actuator position to point the targeting sensor at the object predicted location 1095 and an actuator position to point the targeting sensor at the object target location 1096. The offset may be an offset between a current actuator position and an actuator position to point the implement at the object target location 1096. The offset may be an offset between an actuator position to point the implement at the object predicted location 1095 and an actuator position to point the implement at the object target location 1096. The offset may be an offset between the predicted location 1095 on the surface and the object target location 1096 on the surface. The offset may be determined as a function of surface coordinates, pixel positions, actuator positions, or a combination thereof. In some embodiments, the location refinement module may refine the target location 1096 based on a motion of the detection system and a time since the targeting image was collected. For example, the motion may be determined using a wheel encoder, a range sensor, an IMU, or a GPS.

In response, the targeting control module 1055 may adjust the position, orientation, or direction of an implement based on the target location of the object determined by the location refinement module 1070 and communicated to the targeting control module 1055 via line 1071. In some embodiments, the targeting control module 1055 may adjust the position, orientation, or direction of an implement 1080 via line 1057 by moving an actuator that adjusts the position or orientation of the implement 1080. In some embodiments, the targeting control module 1055 may adjust the position, orientation, or direction of the targeting sensor 1060 via line 1056, and the targeting sensor may collect an image of a target region 1093 of the surface 1090 containing the object target location 1096 of the object O via line 1062. In some embodiments, the targeting control module 1055 may control the position, orientation, or direction of the implement 1080 by moving an actuator that adjusts the position or orientation of a reflective surface that directs an emission, such as a laser emission, from the implement toward the object target location 1096.

In some embodiments, movement of the implement 1080 is coupled to movement of the targeting sensor 1060 such that the implement 1080 is directed toward a fixed position relative to the field of view of the targeting sensor 1060. In some embodiments, movement of the implement 1080 is controlled by the same actuators as movement of the targeting sensor 1060.

The implement 1080 may perform an action on the object of interest by directing the implement toward the object target location 1096 via line 1081. For example, the implement 1080 may be a laser that emits laser light toward the object O at the object target location 1096. In another example, the implement 1080 may be a grabbing tool that grabs the object O at the object target location 1096. In another example, the implement 1080 may be a spraying tool that sprays a fluid at the object O at the object target location 1096. In some embodiments, the implement 1080 may be a planting tool that plants a plant at the target location 1096. In some embodiments, the implement 1080 may be a harvesting tool that harvests the object O at the object target location 1096. In some embodiments, the implement 1080 may be a pollinating tool that pollinates the object O at the object target location 1096.

Methods for Object Identification and Point-to-Point Targeting

The methods described herein may be used to identify and target an object of interest using the detection systems described herein. Identification and targeting of the object may comprise coordinating a handoff between two or more sensors by identifying the object in an image or representation collected by a first sensor, for example a prediction sensor, and identifying the same object in an image or representation collected by a second sensor, for example a targeting sensor. In some embodiments, identifying the same object in the image collected by the second sensor may comprise identifying an object in the image and determining whether the object is the same as the object identified in the image collected by the first sensor. The sensor handoff may be complicated due to differences between the prediction sensor and the targeting sensor, such as sensor type, resolution, magnification, field of view, or color balance and sensitivity, differences in imaging angle or position, movement of the detection system, variability of non-planar surfaces, or changes in the object between when the prediction image was collected and when the targeting image was collected.

Figure 11:
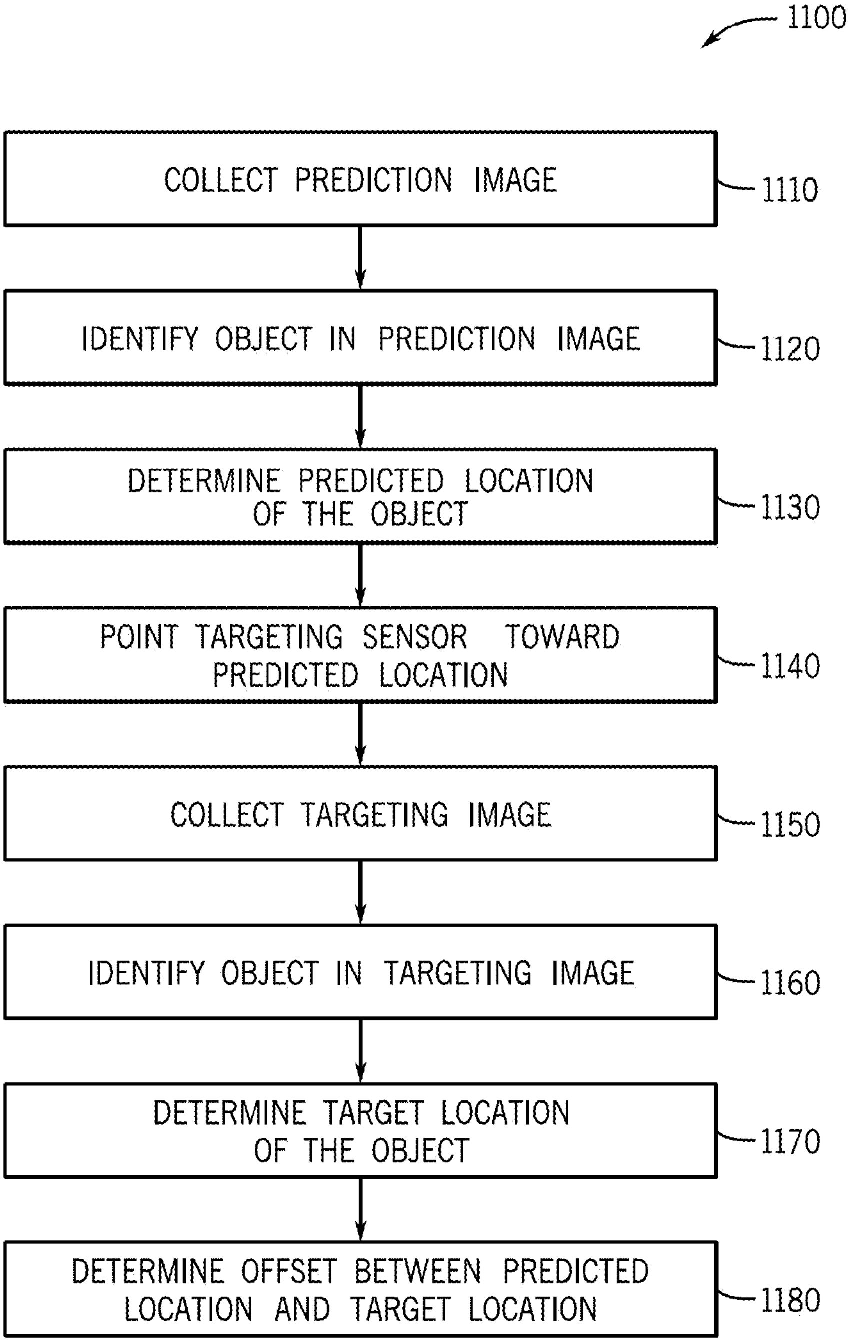
FIG. 11 depicts a method for identifying, locating, and targeting an object, in accordance with one or more embodiments herein.

FIG. 11 depicts an example of a method 1100 for coordinating a sensor handoff using point-to-point targeting to locate and target an object. The method may be implemented using a detection system described herein, for example detection system 1000 depicted in FIG. 10A. In some embodiments, the method 1100 may be implemented by a detection system comprising a prediction module, comprising a prediction sensor and an object identification module, and a targeting module, comprising a targeting sensor and an object matching module. For example, method may be implemented using the detection system illustrated in FIG. 8, or FIG. 10A.

At 1110 of FIG. 11, the prediction sensor collects a prediction image, for example using a prediction module 1010 as seen in FIG. 10A. An object of interest is identified in the prediction image at 1120, for example of a region of interest 1091 as seen in FIG. 10A. In some embodiments, the object of interest is identified using an object identification module, such as an object identification machine learning model. A predicted location of the object of interest is determined at 1130, for example the object predicted location 1095 as seen in FIG. 10A. In some embodiments, the predicted location is determined based on a pixel location of the object of interest in the prediction image. In some embodiments, the predicted location accounts for movement of the detection system relative to the object between a time when the prediction image was collected and a time at which a targeting image will be collected. Positions of actuators controlling the position, orientation, or direction of a targeting sensor may be determined based on the predicted location. For example, pan or tilt values of one or more actuators controlling one or more mirrors that reflect light toward the targeting sensor may be determined based on the predicted location. In another example, position values of one or more actuators that move, tilt, or rotate the targeting sensor may be determined based on the predicted location. In some embodiments, an actuator may be a motor, a solenoid, a galvanometer, or a servo. Converting the prediction location to actuator positions may comprise applying a calibration factor to convert the predicted location or the location of the object in the prediction image to actuator positions.

At 1140 the targeting sensor is pointed toward the predicted location of the object of interest, and the targeting sensor collects an image of the predicted location at 1150, for example, using the targeting module 1050 of FIG. 10A. The object of interest is identified in the targeting image at 1160, for example of prediction region 1092 or target region 1093. The object of interest may be identified by matching an object identified in the targeting image to the object of interest identified in the prediction image of the region of interest 1091. In some embodiments, object matching is performed by an object matching module, such as an object matching machine learning model. To match an object identified in the targeting image to the object of interest identified in the prediction image, the object matching module may account for differences between the prediction sensor and the targeting sensor, such as sensor type, resolution, magnification, field of view, or color balance and sensitivity, differences in imaging angle or position, movement of the detection system, variability of non-planar surfaces, or changes in the object between when the prediction image was collected and when the targeting image was collected. If the object of interest is not identified in the targeting image, the position, orientation, or direction of the targeting sensor may be adjusted, and a second targeting image may be collected. In some embodiments, this process may be repeated until the object of interest is identified in the targeting image.

Once the object of interest is identified in the targeting image, the target location of the object of interest is determined at 1170. In some embodiments, the target location of the object of interest may be determined based on a pixel position of the object in the targeting image. In some embodiments, the target location may be determined from the position of the object identified by the object matching module. In some embodiments, determining the target location may comprise converting a pixel location in the targeting image to a position of the object on the surface using a calibration factor. In some embodiments, the target location may account for movement of the detection system relative to the object between a time when the targeting image was collected and a time at which manipulation will be performed.

At 1180 an offset between the target location of the object of interest and the predicted location is determined. In some embodiments, the position of the targeting sensor may be adjusted based on the determined offset. In some embodiments, an implement is positioned based on the target location of the object or based on an offset. In some embodiments, the position of the implement is fixed relative to the targeting sensor. In some embodiments, motions of the targeting sensor and the implement are coordinated. The implement may be directed toward the target location of the object to perform an action on or manipulate the object. For example, the implement may be a laser that emits laser light toward the object. In another example, the implement may be a grabbing tool that grabs the object. In another example, the implement may be a spraying tool that sprays a fluid at the object. In another example, the implement may be a pollinating tool that pollinates the object. In some embodiments, the implement may be a planting tool that plants a plant at the object location, a picking tool that picks the object, an inspecting tool that inspects the object, a soil sampling tool that samples soil at the object location, an operating tool that operates on the object, a repair tool that repairs the object, or a welding tool that welds the object.

Machine Learning Models for Object Identification

As described herein, a method for locating and targeting an object may comprise identifying an object in an image collected by a sensor, for example a prediction sensor. In some embodiments, object identification may be performed using an object identification module, such as an identification machine learning model. In some embodiments, the machine learning model may be a deep learning model, such as a deep learning neural network. The object identification module may be used by a prediction system to identify an object of interest and differentiate the object of interest from other objects in a prediction image collected by a prediction sensor. For example, the object identification module may identify weeds in a prediction image and differentiate the weeds from other plans, such as crops, in the prediction image. In another example, the object identification module may identify pieces of debris in a prediction image and differentiate the debris from other items in the prediction image.

The object identification machine learning model may be trained using images of objects labeled by human users. The images may contain different objects corresponding to objects of interest or other objects not of interest. For example, the images may be of different types of plants, and plants in the images may be identified by human users and designated as weeds or not weeds, and the images may be labeled accordingly. For example, the human user may mark the plant as a crop, such as an onion, a strawberry, corn, or potato, or as a weed, such as a dandelion, bindweed, a thistle, quackgrass, or shepherd's purse. The identification machine learning model may be trained using the labeled images and may extract features of various objects. For example, the deep learning model may extract features of different plant types. In some embodiments, the training images are high resolution images to facilitate feature extraction by the deep learning model. To validate the model, the object identification module may identify objects in unlabeled images that have not been used to train the model. The identifications from the model may be compared to identifications from human users.

Machine Learning Models for Object Matching

As described herein, a method for locating and targeting an object may comprise matching an object identified in an image collected by a first sensor, such as a prediction sensor, to an object identified in an image collected by a second sensor, such as a targeting sensor. The first sensor and the second sensor may have different properties that make it difficult to identify the same object in an image collected by the first sensor and an image collected by the second sensor. For example, the first sensor and the second sensor may have different sensor types, resolutions, magnifications, fields of view, or color balances and sensitivities, or the sensors may be positioned differently relative to the object.

Differences between the first sensor and the second sensor may cause the same object to appear different in an image collected by the first sensor and an image collected by the second sensor. Other factors that may cause the same object to appear different in an image collected by the first sensor and an image collected by the second sensor may include variability of non-planar surfaces, movement of the sensors or changes in the object between when the image was collected by the first sensor and when the image was collected by the second sensor. An object matching machine learning model may be used to match an object identified an image collected by a first sensor, such as a prediction sensor, to an object identified in an image collected by a second sensor, accounting for differences in object appearance between the image collected by the first sensor and the image collected by the second sensor. In some embodiments, the machine learning model may be a deep learning model, such as a deep learning neural network.

The matching machine learning model may be trained using images of objects collected by the prediction sensor and images of the same objects, different objects, or no objects collected by the targeting sensor. In some embodiments, images containing the same object from the prediction sensor and the targeting sensor were collected within about 1 second, about 10 seconds, about 30 seconds, about 1 minute, about 5 minutes, about 15 minutes, about 30 minutes, about 45 minutes, about 1 hour, about 2 hours, about 6 hours, about 12 hours, about 24 hours, or about 48 hours of each other to minimize changes in the object between when the prediction image is collected and when the targeting image is collected. In some embodiments, human users may be provided the image of the objects collected by the prediction sensor and manually identified the same object in the images collected by the targeting sensor, and the targeting images may be labeled accordingly.

The matching machine learning model may be trained using the labeled targeting images in combination with the prediction images of the objects. The matching machine learning model may be trained to identify the same object imaged by sensors with different resolutions, fields of view, and color sensitivities collected from different angles and distances. To validate the model, the object matching module may be provided an image of an object collected by the prediction sensor that was not used for training and may identify the same object in unlabeled images collected by the targeting sensor. Identifications from the model may be compared to identifications from human users.

Accuracy of the object matching model may be assessed by measuring the percent of direct hits, percent of hits within a pre-determined distance of the object, and percent misses outside of the pre-determined distance from the object or with no object present. Sensitivity and specificity are assessed by determining the frequency at which an object is identified when no object is present (false positive rate) and the frequency at which no object is identified when an object is present (false negative rate).

Point-to-Point Targeting and Coordinating Sensor Handoff

The object identification and object matching methods described herein may be implemented by a system comprising two or more image sensors to coordinate a sensor handoff and perform point-to-point targeting of an object. An object may be identified and located in an image collected by a first sensor, such as a prediction sensor, and the same object may be located more precisely in an image collected by a second sensor, such as a targeting sensor, using an object matching module. In some embodiments, the object is manually identified in the image collected by the first sensor. In some embodiments, the object is identified in the image collected by the first sensor using an object identification module that implements software to identify an object. In some embodiments, the object identification module may implement an identification machine learning model. In some embodiments, the object identification module may implement a heuristic model, thresholding, or a classical detection algorithm. In some embodiments, the object identification module identifies the object using spectroscopic data. In some embodiments, the object is identified in the image collected by the first sensor based on its location, such as a pixel location, within the image.

The second sensor may have a different position, orientation, distance, or resolution than the first sensor. Using an object matching module to match an object in the image collected by the second sensor to the object identified in the image collected by the first sensor may facilitate the handoff between the first sensor and the second sensor, enabling location of the same object by the first sensor and the second sensor. The first image sensor may have a wider field of view than the second sensor, which may allow the object to be more precisely located in an image collected by the second sensor than in an image collected by the first sensor. A system may have 3, 4, 5, 6, 7, 8, 9, 10, or more sensors, which may allow 2, 3, 4, 5, 6, 7, 8, 9, 10, or more objects to be located in one or more images collected by the first sensor. For example, a system may have 2, 3, 4, 5, 6, 7, 8, 9, 10, or more targeting sensors. Each of the 2, 3, 4, 5, 6, 7, 8, 9, 10, or more objects may be matched and located in images collected by the second, third, fourth, fifth, sixth, seventh, eighth, ninth, tenth, or more sensor, enabling simultaneous targeting of multiple objects by the 3, 4, 5, 6, 7, 8, 9, 10, or more sensors.

A first sensor, such as a prediction sensor, may image an area or a region of a surface. The first sensor may have a higher resolution, a wider field of view, or a different position, distance, or orientation than a second sensor, such as a targeting sensor. In some embodiments, the first sensor may be positioned on a vehicle, such as a driving, flying or orbiting vehicle. For example, the first sensor may be positioned on a car, a remote-controlled car, a self-driving car, an autonomous car, an autonomous weeder, a tractor, a combine, a harvester, a planter, a sprayer, a farm vehicle, a construction vehicle, a bulldozer, a backhoe, a crane, a plane, a helicopter, a remote-controlled plane, a drone, or a satellite. In some embodiments, the second sensor may be positioned on the same vehicle as the first sensor, for example, the same car, remote-controlled car, self-driving car, autonomous car, plane, helicopter, remote-controlled plane, drone, or satellite.

In some embodiments, the second sensor may be positioned on a second vehicle, such as a car, a remote-controlled car, a self-driving car, an autonomous car, a plane, a helicopter, a remote-controlled plane, a drone, or a satellite. The second vehicle with the second sensor, may be at a known or pre-determined position relative to the first vehicle with the first sensor. For example, the first vehicle and the second vehicle may be at a fixed position relative to one another. In another example, the relative position between the first vehicle and the second vehicle may be determined by global positioning system (GPS), radar, LIDAR, sonar, or long-range navigation (LORAN). The second sensor may be positioned on the same or different type of vehicle. For example, the first sensor may be positioned on an orbiting vehicle, such as a satellite, and the second sensor may be positioned on a flying sensor, such as a plane, a helicopter, a remote-controlled plane, or a drone. In another example, the first sensor may be positioned on a flying sensor, such as a plane, a helicopter, a remote-controlled plane, or a drone, and the second sensor may be positioned on a driving vehicle, such as a car, a tractor, a remote-controlled car, a self-driving car, or an autonomous car.

An object identification module may be used to identify objects of interest located within an image collected by the first sensor. In some embodiments, the object identification module may differentiate the object of interest from other objects. A prediction system in communication with the first sensor may select an object of interest to target from the identified objects of interest. The prediction system may determine a predicted location of the object. In some embodiments, the predicted location is determined using empirically determined calibration factors coordinating a pixel location in the image to a surface location, a vehicle position, a position, direction, or orientation of the first sensor, a position, direction, or orientation of the second sensor, or combinations thereof. The predicted location of the object may be sent to a targeting system in communication with the second sensor.

The targeting system may adjust the position, orientation, or direction of the second sensor, or the position, orientation, or direction of a vehicle carrying the second sensor, to point the second sensor toward the predicted location of the object. For example, the targeting system may adjust the positions of one or more actuators controlling the second sensor or controlling one or more mirrors reflecting light toward the second sensor, or the targeting sensor may move the vehicle to adjust the position, orientation, or direction of the second sensor. In some embodiments, movement of the second sensor may be linked to movement of an implement, for example a laser, such that the movement of the second sensor and the movement of the implement are correlated. In some embodiments, an implement may be controlled independently of the second sensor. In some embodiments, the position, orientation, or direction of the implement relative to the position, orientation, or direction of the second sensor is known.

The second sensor may image the area or region of the surface at the predicted location of the object of interest. In some embodiments, the area imaged by the second sensor may be smaller than the area imaged by the first sensor, as illustrated in FIG. 10B. The inset of FIG. 10B shows an image of a region of a surface imaged by a prediction sensor containing an object of interest and cropped around the object of interest. The larger image of FIG. 10B shows an image of a region of the surface imaged by a targeting sensor containing the same object of interest, as determined by an object matching machine learning model.

The targeting system may use an object matching module, such as an object matching machine learning model, to determine if the selected object is present in the image collected by the second sensor. If the object is present in the image, the object matching module may determine a target location of the object. The target location of the object may be closer to the actual location of the object than the predicted location of the object determined from the image collected by the first sensor. In some embodiments, the target location is determined based on calibration factors correlating a pixel position of the object in the image collected by the second sensor to a surface location, a vehicle position, a position, direction, or orientation of the second sensor, or combinations thereof.

The targeting system may determine an offset between the predicted location of the object and the target location of the object. In some embodiments, the offset may be an offset between the predicted surface location and the target surface location of the object. In some embodiments, the offset may be an offset between the position, direction, or orientation of the second sensor at the predicted location of the object and the position, direction, or orientation of the second sensor at the target location of the object. In some embodiments, the offset may be an offset between the position, direction, or orientation of the second sensor at the predicted location of the object and the position, direction, or orientation of the implement at the target location of the object. In some embodiments, the offset may be an offset between the position, direction, or orientation of the implement at the predicted location of the object and the position, direction, or orientation of the implement at the target location of the object. In some embodiments, the offset may be an offset between the current position, direction, or orientation of the implement and the position, direction, or orientation of the implement directed toward the target location of the object. In some embodiments, the offset may be an offset between the position, direction, or orientation of the second sensor at the predicted location of the object and the position of the vehicle at the target location of the object. In some embodiments, the offset may be an offset between the position of the vehicle at the predicted location of the object and the position of the vehicle at the target location of the object.

The position, direction, or orientation of the second sensor, the implement, the vehicle, or combinations thereof may be adjusted based on the offset toward the target position of the object. The implement may be used to manipulate the object at the target location of the object. For example, the implement may be a laser that emits laser light toward the object. In another example, the implement may be a grabbing tool that grabs the object. In another example, the implement may be a spraying tool that sprays a fluid at the object. In another example, the implement may be a pollinating tool that pollinates the object.

Use of point-to-point targeting to coordinate a sensor handoff, for example by locating an object of interest in an image collected by a first sensor and identifying the same object in an image collected by a second sensor using an object matching module, may provide improved object targeting accuracy over methods that do not use point-to-point targeting. In some embodiments, coordinating a sensor handoff using point-to-point targeting may provide increased targeting accuracy of objects positioned on or near uneven or irregular surfaces. In some embodiments, point-to-point targeting may enable coordinating a sensor handoff between sensors of different types or with different specifications.

For example, point-to-point targeting may enable a sensor handoff between a LIDAR detector and a camera, between a high-resolution camera and a lower resolution camera, or between a color camera and a black and white camera. In some embodiments, point-to-point targeting may be used to locate an object of interest with a higher quality sensor, such as higher resolution, better color reproduction, or wider field of view, and target the object with a lower quality of sensor, and may provide improved targeting over targeting the object with the lower quality sensor alone. In some embodiments, point-to-point targeting may account for unknown time-based movements of an object and may provide improved targeting of moving objects or targeting of objects from a moving vehicle.

A detection system implementing the point-to-point targeting methods of the present disclosure may be used to target an object with improved accuracy over a system that is not using point-to-point targeting. In some embodiments, an implement of a detection system using point-to-point targeting may target an object of interest within about 1 mm, about 1.5 mm, about 2 mm, about 2.5 mm, about 3 mm, about 4 mm, about 5 mm, about 6 mm, about 7 mm, about 8 mm, about 9 mm, about 10 mm, about 15 mm, about 20 mm, about 25 mm, about 30 mm, about 40 mm, about 50 mm, about 60 mm, about 70 mm, about 80 mm, about 90 mm, about 100 mm, about 150 mm, about 200 mm, about 300 mm, about 400 mm, about 500 mm, about 1 m, about 1.5 m, about 2 m, about 2.5 m, about 3 m, about 4 m, about 5 m, about 6 m, about 7 m, about 8 m, about 9 m, about 10 m, about 15 m, about 20 m, about 25 m, about 30 m, about 40 m, about 50 m, about 60 m, about 70 m, about 80 m, about 90 m, or about 100 m of the actual location of the object of interest.

In some embodiments, the target location of the object of interest determined using point-to-point targeting may be within about 1 mm, about 1.5 mm, about 2 mm, about 2.5 mm, about 3 mm, about 4 mm, about 5 mm, about 6 mm, about 7 mm, about 8 mm, about 9 mm, about 10 mm, about 15 mm, about 20 mm, about 25 mm, about 30 mm, about 40 mm, about 50 mm, about 60 mm, about 70 mm, about 80 mm, about 90 mm, about 100 mm, about 150 mm, about 200 mm, about 300 mm, about 400 mm, about 500 mm, about 1 m, about 1.5 m, about 2 m, about 2.5 m, about 3 m, about 4 m, about 5 m, about 6 m, about 7 m, about 8 m, about 9 m, about 10 m, about 15 m, about 20 m, about 25 m, about 30 m, about 40 m, about 50 m, about 60 m, about 70 m, about 80 m, about 90 m, or about 100 m of the actual location of the object of interest.

In some embodiments, the predicted location and the target location of the object of interest, determined using point-to-point targeting, may be within about 1 mm, about 1.5 mm, about 2 mm, about 2.5 mm, about 3 mm, about 4 mm, about 5 mm, about 6 mm, about 7 mm, about 8 mm, about 9 mm, about 10 mm, about 15 mm, about 20 mm, about 25 mm, about 30 mm, about 40 mm, about 50 mm, about 60 mm, about 70 mm, about 80 mm, about 90 mm, about 100 mm, about 150 mm, about 200 mm, about 300 mm, about 400 mm, about 500 mm, about 1 m, about 1.5 m, about 2 m, about 2.5 m, about 3 m, about 4 m, about 5 m, about 6 m, about 7 m, about 8 m, about 9 m, about 10 m, about 15 m, about 20 m, about 25 m, about 30 m, about 40 m, about 50 m, about 60 m, about 70 m, about 80 m, about 90 m, or about 100 m of the actual location of the object of interest.

Optical System Calibration Methods

The systems and methods disclosed herein may further comprise one or more calibration steps to calibrate position, direction, orientation, or motion of a prediction sensor, a targeting sensor, an implement, or combinations thereof. In some embodiments, calibration may be used to correlate a location, such as a pixel location, in an image or representation collected by a prediction sensor or a targeting sensor to a location on a surface. In some embodiments, calibration may be used to correlate a location in an image or representation collected by a first sensor, such as a prediction sensor, to a location in an image or representation collected by a second sensor, such as a targeting sensor. In some embodiments, calibration may be used to correlate a location in an image collected by a prediction sensor to a position, direction, orientation, or motion of a targeting sensor. In some embodiments, calibration may be used to correlate a location in an image collected by a targeting sensor to a position, direction, orientation, or motion of the targeting sensor, an implement, or both. In some embodiments, calibration may be used to correlate a position, direction, orientation, or motion of an implement to a location on a surface. Calibration methods may use empirical measurements to correlate positions, orientations, locations, or movements. Alternatively or in addition, calibration methods may use mathematical models to correlate positions, orientations, locations, or movements.

Calibration of Prediction Sensors and Targeting Sensors

The systems of the present disclosure may be calibrated to correlate a position or direction of a targeting sensor to a region of a prediction image collected by a prediction sensor. Correlation between the direction of the targeting sensor and a region of the prediction camera may be performed using a calibration surface with distinguishable features or distinct fiducial markers, such as the calibration grid shown in FIG. 12. In some embodiments, the calibration surface may be a surface with markings on it. In some embodiments, the calibration surface may be a surface with distinguishable objects on it. In some embodiments, the calibration may be a surface with variations, such as color, texture, or density variations.

A system containing a prediction sensor and a targeting sensor is positioned at a fixed position relative to the calibration surface such that the calibration surface overlaps with the field of view of the prediction sensor and the field of view of the targeting sensor. For example, the system may be placed on the surface. The prediction sensor may collect an image of the calibration surface. The targeting sensor may collect a series of images of the calibration surface from different targeting sensor positions or directions. Each different position or direction of the targeting sensor may correspond to a distinct set of positions of actuators controlling the position or direction of the targeting sensor. In some embodiments, the series of images may be collected at random actuator positions.

For each image in the series that contains a region of the calibration surface, the distinguishable features of the calibration surface may be identified and mapped to a region of the prediction image containing the distinguishable features. The corresponding actuator positions for the targeting image may be correlated to the region of the prediction image, such that a location in the prediction image correlates to an actuator position, and to a targeting camera position. In some embodiments, a calibration model may be used to extrapolate corresponding prediction image locations and actuator positions for locations in between the empirically measured sensor positions or directions. In some embodiments, the calibration model is a mathematical model, such as a spline model, a geometric model, or a trigonometric model. In some embodiments, the calibration model may have decreased accuracy for non-planar surfaces.

Figure 12:
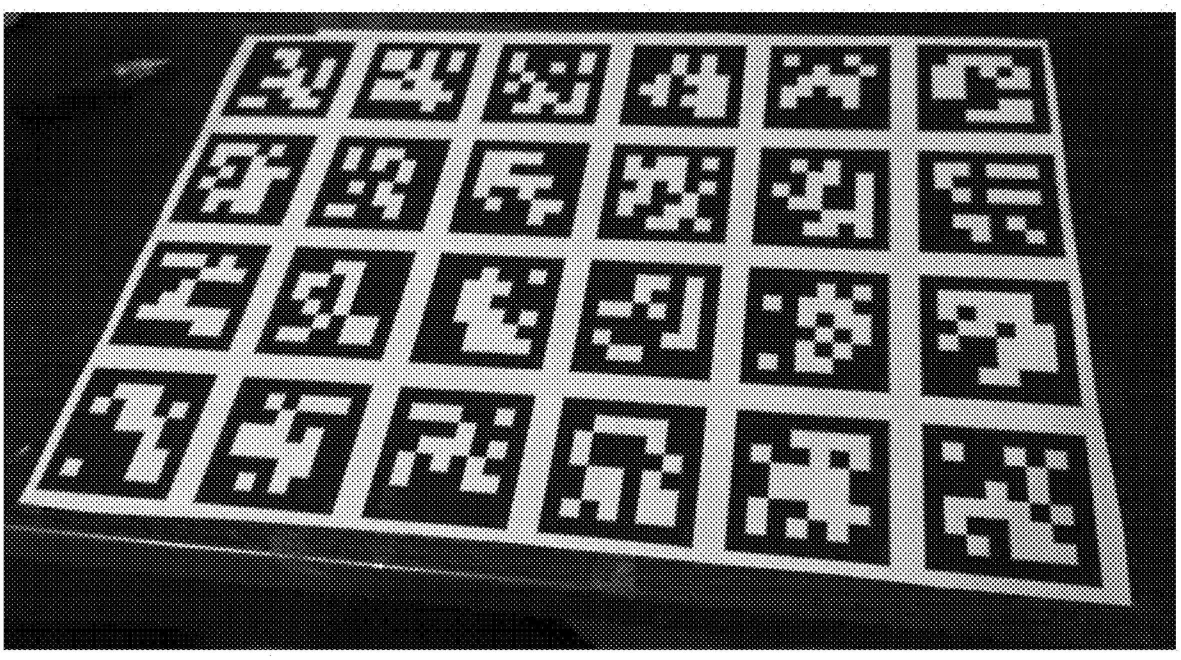
FIG. 12 illustrates a calibration grid for calibrating a prediction sensor or a targeting sensor, in accordance with one or more embodiments herein.

The optical control systems illustrated in FIG. 1-FIG. 3 may be calibrated using the methods described herein. In some embodiments, the camera to control translation system of the prediction module 812 of FIG. 8 is calibrated. In some embodiments, a calibration surface, such as the calibration grid shown in FIG. 12, is positioned within a field of view of a prediction camera. The calibration surface comprises known marks at known positions. The prediction camera may collect a plurality of images of the calibration surface at different positions relative to the calibration surface. The prediction module may then correlate a pixel position of a known mark to the known position on the surface. An interpolation function may be built from a plurality of correlated pixel positions and known surface positions. In some embodiments, the interpolation function may be saved to a hard drive and loaded from the hard drive by the prediction module.

In some embodiments, the camera to control translation system of the targeting module 822 of FIG. 8 is calibrated. In some embodiments, the targeting control module 1055 of FIG. 10A is calibrated. In some embodiments, a calibration surface is positioned within a field of view of a targeting camera. The calibration surface comprises known marks at known positions. The targeting module may collect a plurality of images of the calibration surface and a plurality of actuator positions, such that the plurality of images comprises different fields of view. For example, the targeting module may collect a plurality of images at a plurality of randomly selected pan tilt values of a first actuator and a second actuator. A calibration map may be built from a plurality of sample points. Each sample point may be collected by identifying a pixel location of a known mark in an image collected at a known actuator position and correlating the known location with the actuator position and the pixel location. In some embodiments, the map is fitted to a calibration model. For example, the map may be fitted to a mathematical model, such as a spline smoothing algorithm to build smooth curves to allow for accurate estimation of locations between the sample points. In some embodiments, the calibration model may be saved to a hard drive and loaded from the hard drive by the targeting module.

Calibration of Implements

The systems of the present disclosure may be calibrated to correlate a position or direction of an implement to a pixel position in a targeting image collected by a targeting sensor. In some embodiments the position or direction of the implement is fixed relative to the targeting sensor. For example, a laser implement and a targeting camera may be controlled by the same mirrors, as shown in FIG. 1-FIG. 3, such that the direction of the laser is coupled to the direction of the sensor. In another example, the implement may be rigidly coupled to the targeting sensor, such that the implement moves with the targeting sensor. In some embodiments, the position or direction of the implement relative to the targeting sensor may be adjusted based on the calibration. In some embodiments, the implement may move relative to the targeting sensor.

Calibration of the implement and the targeting sensor may be performed by performing an action with the implement at a location on a surface. In some embodiments, the action may leave a mark on the surface at the location. For example, a laser implement may burn a spot on the surface, or a spraying implement may leave a wet spot on the surface. In some embodiments, the action may alter the surface at the location. For example, a grabbing implement may create a hole in the surface at the location. In some embodiments, the location of the implement may be determined by the targeting sensor. The targeting sensor may collect an image of the surface at the location of action by the implement. The location of action, or the location of the implement, in the targeting image may be determined. A pixel location in the targeting image may be correlated with the location of the implement or the location of action of the implement. In some embodiments, the position of the implement relative to the targeting sensor may be adjusted to a preferred position. For example, the position of the implement relative to the targeting sensor may be adjusted such that the location of action of the implement is at or near the center of the targeting image.

In some embodiments, an optical system of the present disclosure, for example an optical system shown in FIG. 1-FIG. 3, may be calibrated to correlate a pixel position in an image of a surface collected by a targeting sensor with an implement position on the surface, such as a position at which a laser beam encounters the surface or a position at which a tool interacts with an object or the surface. The direction of the targeting sensor and the direction of the implement may be physically linked. For example, the direction of a targeting sensor and the direction of a laser may be physically linked through optical elements that control both the direction of the laser and the direction of the targeting sensor, as shown in FIG. 1-FIG. 3, such that the relative position of the targeting camera and the laser beam position on the surface are fixed. The targeting sensor may collect an image of a surface, and, while in the same position as the sensor, the implement may perform an action at the surface. The point of action is identified in the sensor image, and a pixel position of the point of action is determined. This process of collecting an image, performing an action at the surface, and identifying the pixel position of the point of the action may be repeated to determine a calibration model describing the relationship between the targeting sensor and the point of action on the surface. In some embodiments, the calibration model is a mathematical model. In some embodiments, the calibration model is calculated using a spline model, a geometric model, or a trigonometric model to extrapolate for sensor and implement positions in between the empirically measured positions.

Targeting System Fine Motion Calibration

Fine motions of a sensor or an implement of the present disclosure may be calibrated to locations or distances on a surface. Fine motion calibrations of a sensor may be performed by collecting a first image of a calibration surface with the sensor, adjusting the sensor position, and collecting a second image of the calibration surface. In some embodiments, the adjustment is performed using actuators. Positions of distinguishable features in the first image and the second image may be determined, and the distance and direction of motion between the two positions may be determined. The distance and direction of motion may be correlated with the magnitude and direction of the actuator motion. This process may be repeated for many different actuator motions or positions to determine a calibration model. In some embodiments, a mathematical model, such as a spline model, a geometric model, or trigonometric model, may be used to extrapolate corresponding sensor and actuator motions, such as mirror pan and tilt values, for positions in between the empirically determined points. For example, the corresponding sensor and actuator motions may be extrapolated using a spline model. In some embodiments, the calibration model may have decreased accuracy for non-planar surfaces.

Fine motion calibration of an implement may be performed by, directing the implement to a location on a surface, and collecting a first image of the calibration surface with a sensor, such as a targeting sensor. The location of the implement in the first image may be determined by the location of the implement itself, or the location of an action performed by the implement. In some embodiments, an action performed by the implement may leave a mark on the surface or alter the surface. The implement position may be adjusted, and a second image of the surface may be collected by the sensor. In some embodiments, the adjustment is performed using actuators. Locations of the implement, or locations of actions performed by the implement, in the first image and the second image may be determined, and the distance and direction of motion between the two positions may be determined. The distance and direction of motion may be correlated with the magnitude and direction of the actuator motion.

This process may be repeated for many different actuator motions or positions to determine a calibration model. The calibration model may be used to extrapolate corresponding implement and actuator motions, such as mirror pan and tilt values, for positions in between the empirically determined points. In some embodiments, the calibration model is a mathematical model, such as a spline model, a geometric model, or trigonometric model. In some embodiments, the calibration may have decreased accuracy for non-planar surfaces.

Computer Systems and Methods

The object identification and targeting methods may be implemented using a computer system. In some embodiments, the detection systems described herein include a computer system. In some embodiments, a computer system may implement the object identification and targeting methods autonomously without human input. In some embodiments, a computer system may implement the object identification and targeting methods based on instructions provided by a human user through a detection terminal.

Figure 13:
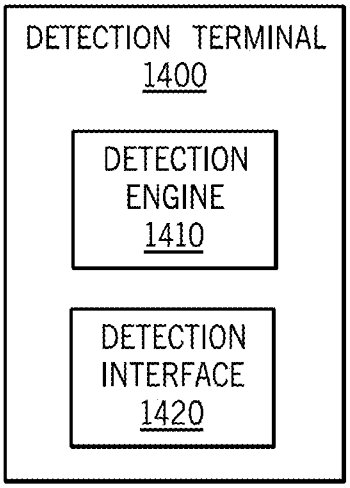
FIG. 13 is a block diagram illustrating components of a detection terminal in accordance with embodiments of the present disclosure.

FIG. 13 illustrates components in a block diagram of a non-limiting exemplary embodiment of a detection terminal 1400 according to various aspects of the present disclosure. In some embodiments, the detection terminal 1400 is a device that displays a user interface in order to provide access to the detection system. As shown, the detection terminal 1400 includes a detection interface 1420. The detection interface 1420 allows the detection terminal 1400 to communicate with a detection system, such a detection system of FIG. 8 or a detection system of FIG. 10A. In some embodiments, the detection interface 1420 may include an antenna configured to communicate with the detection system, for example by remote control. In some embodiments, the detection terminal 1400 may also include a local communication interface, such as an Ethernet interface, a Wi-Fi interface, or other interface that allows other devices associated with detection system to connect to the detection system via the detection terminal 1400. For example, a detection terminal may be a handheld device, such as a mobile phone, running a graphical interface that enables a user to operate or monitor the detection system remotely over Bluetooth, Wi-Fi, or mobile network.

The detection terminal 1400 further includes detection engine 1410. The detection engine may receive information regarding the status of a detection system, for example a detection system of FIG. 8 or a detection system of FIG. 10A. The detection engine may receive information regarding the number of objects identified, the identity of objects identified, the location of objects identified, the number of objects targeted, the identity of objects targeted, the location of objects targeted, the location of the detection system, the elapsed time of a task performed by the detection system, an area covered by the detection system, a battery charge of the detection system, or combinations thereof.

Actual embodiments of the illustrated devices will have more components included therein which are known to one of ordinary skill in the art. For example, each of the illustrated devices will have a power source, one or more processors, computer-readable media for storing computer-executable instructions, and so on. These additional components are not illustrated herein for the sake of clarity.

Figure 14:
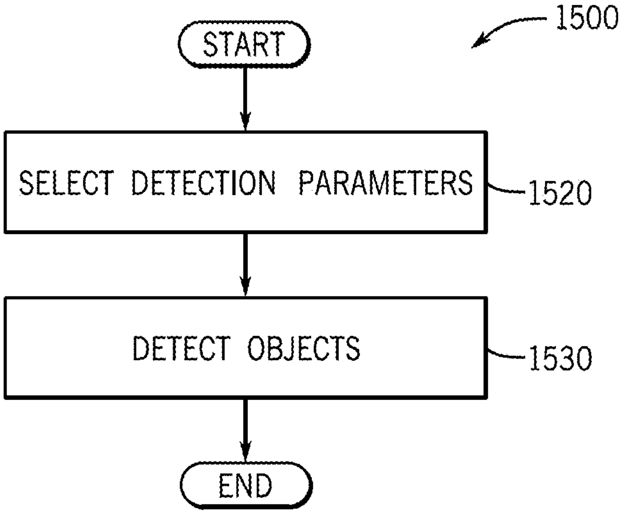
FIG. 14 is a flowchart illustrating a procedure for determining a detection terminal location in accordance with embodiments of the present disclosure.

FIG. 14 is a flowchart that illustrates a non-limiting example embodiment of a procedure 1500 for detecting objects according to various aspects of the present disclosure. The procedure 1500 is an example of a procedure suitable for use with the detection terminal 1400 shown in FIG. 13 for configuring a detection terminal for communicating with a detection system of the present disclosure. In some embodiments, the procedure 1500 is executed recursively to adjust for changes in detection system, objects, the detection terminal 1400.

In block 1520, parameters for detecting objects of interest are selected.

In block 1530, a detection system is directed to detect objects in accordance with the detection parameters.

While illustrative embodiments have been illustrated and described, it will be appreciated that various changes can be made therein without departing from the spirit and scope of the disclosure.

Figure 15:
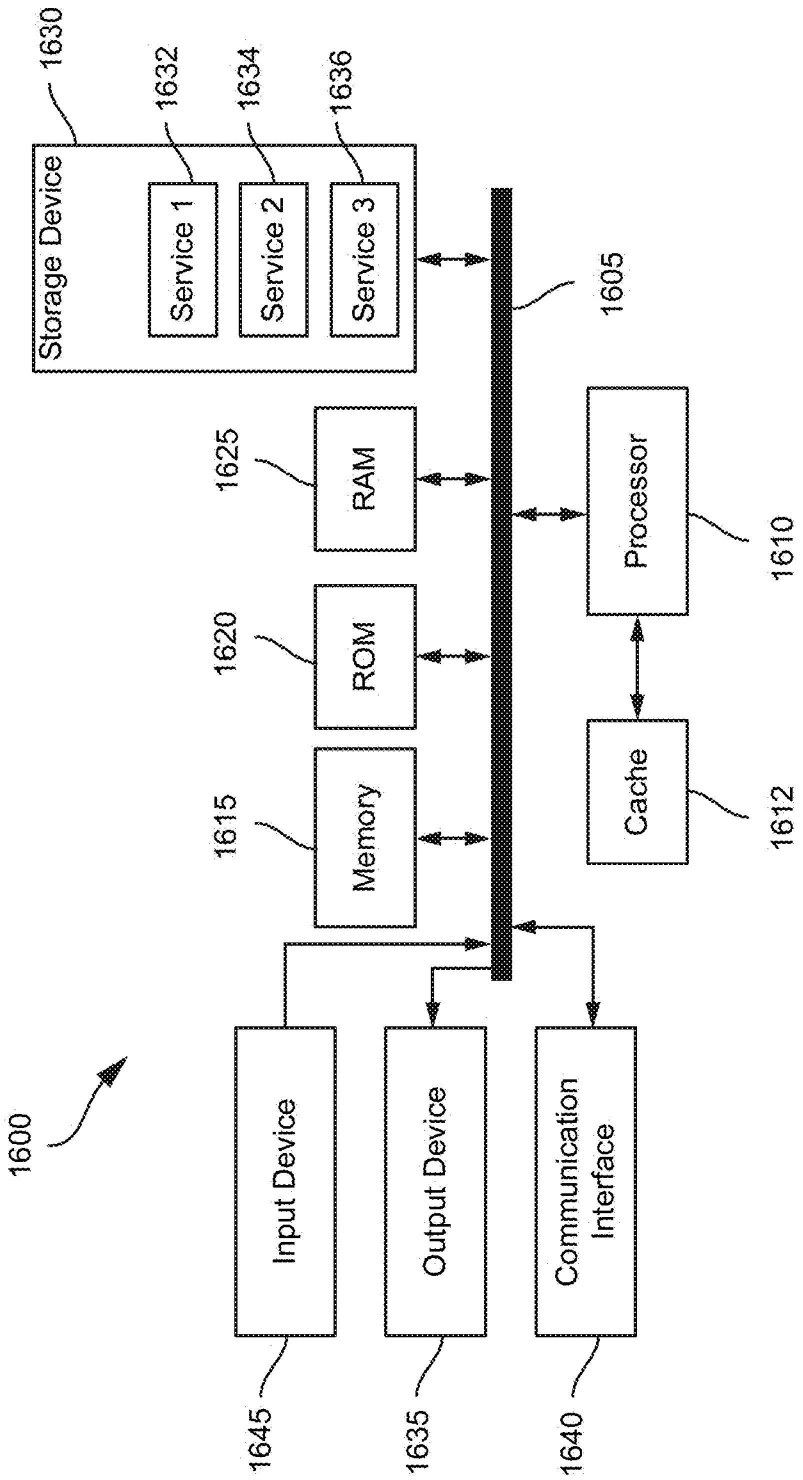
FIG. 15 is an exemplary block diagram of a computing device architecture of a computing device which can implement the various techniques described herein.

In some examples, the procedures described herein (e.g., procedure 900 of FIG. 9, 1100 of FIG. 11, or 1500 of FIG. 14, or other procedures described herein) may be performed by a computing device or apparatus, such as a computing device having the computing device architecture 1600 shown in FIG. 15. In one example, the procedures described herein can be performed by a computing device with the computing device architecture 1600. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including procedure 900, 1100, or 1500. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Procedures 900, 1100, and 1500 are illustrated as a logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 15 illustrates an example computing device architecture 1600 of an example computing device which can implement the various techniques described herein. For example, the computing device architecture 1600 can implement the detection system shown in FIG. 10A. The components of computing device architecture 1600 are shown in electrical communication with each other using connection 1605, such as a bus. The example computing device architecture 1600 includes a processing unit (which may include a CPU and/or GPU) 1610 and computing device connection 1605 that couples various computing device components including computing device memory 1615, such as read only memory (ROM) 1620 and random access memory (RAM) 1625, to processor 1610. In some embodiments, a computing device may comprise a hardware accelerator.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1610, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communication interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

EXAMPLES

The invention is further illustrated by the following non-limiting examples.

Example 1

Eradication of Weeds in a Field of Crops

This example describes eradication of weeds in a field of crops using the detection systems and methods of the present disclosure. An autonomous vehicle, as illustrated in FIG. 6 and FIG. 7, equipped with a prediction system, a targeting system, and an infrared laser was positioned in a field of crops. The vehicle autonomously navigated the rows of crops, and a prediction camera with a wide-angle view, imaged the field. The prediction camera had a field of view of 27.7 in. parallel to the direction of travel of the autonomous vehicle and 20 in. perpendicular to the direction of travel. The prediction system identified weeds within the images collected by the prediction camera and differentiated the weeds from the crops using a trained identification machine learning model which identifies features of the weeds and distinguishes them from features of the onion crops. The prediction system selected a weed of the identified weeds to eradicate and determined a predicted location of the weed based on the pixel location of the weed in the prediction image. The prediction sent the predicted location to the targeting system.

The targeting system included a targeting camera and infrared laser, the directions of which were adjusted by mirrors controlled by actuators. The mirrors reflected the visible light from the surface to the targeting camera and reflected the infrared light from the laser to the surface, as shown in FIG. 1-FIG. 3. The targeting system converted the predicted location received from the prediction system to actuator positions based on empirically determined calibration factors correlating object location coordinates to actuator positions to point the targeting camera and the laser toward the predicted location. The targeting system adjusted the actuators to point the targeting camera and infrared laser beam toward the predicted position of the selected weed. The targeting camera, with a narrower field of view than the prediction camera, imaged the field at the predicted position of the weed. The targeting camera had a field of view of 6 in. parallel to the direction of travel of the autonomous vehicle and 4.5 in. perpendicular to the direction of travel. Using an object matching machine learning model, the targeting system determined whether the weed is within the images collected by the targeting camera and, if so, the target location of the weed. The object matching machine learning model accounted for movement of the autonomous vehicle between collection of the prediction image and targeting of the weed, differences in camera perspective and image properties between the prediction camera and the targeting camera, and variability in the three-dimensional environment due to rugged terrain and weed height. Using the object matching machine learning model, the targeting system determined a target location of the weed and determined an offset between the predicted weed location and the target weed location. The targeting system adjusted the position of the targeting camera and infrared laser beam based on the target position of the weed and activated the infrared beam directed toward the location of the weed. The beam irradiated the weed with infrared light for an amount of time sufficient to damage or kill the weed, while adjusting the position of the laser beam to account for movement of the autonomous vehicle during irradiation. The system was calibrated such that position irradiated by the laser is within 5 mm, preferably within 2 mm, of the target location of the weed.

The vehicle included four targeting systems, as shown in FIG. 5 and FIG. 6, so the targeting process could be performed multiple times in parallel. Each targeting system covered a different, but overlapping, region of the prediction system. A second weed was identified in the image collected by the prediction camera. The prediction system sent the predicted position of the second weed to a second targeting system, based on the availability of the targeting system and the range of the targeting system to target the predicted location of the second weed. The process was repeated until all the weeds in the field of crops were eradicated, until the autonomous vehicle was finished navigating the field, or until another end point.

Example 2

Automated Debris Identification and Removal in a Rugged Construction Environment This example describes a system and method for automated identification and removal of debris in a rugged environment. An autonomous vehicle with a prediction camera, a targeting camera, and a debris collection implement autonomously navigates a construction site. The construction site has a rugged terrain surface. The prediction camera images a region of the construction site surface and detects objects within the image. A trained identification machine learning model identifies the objects and selects an object that is identified as debris.

A prediction system determines a predicted location of the debris using a calibration model and sends the predicted location to a targeting system. The targeting system is selected based on availability and proximity to the selected debris. The targeting system directs actuators controlling the targeting camera and the debris collection implement to point the targeting camera and the debris collection implement toward the predicted location of the debris. The targeting camera images the terrain surface at the predicted location of the debris, and a trained matching machine learning model determines whether the debris is located within the image, and the target location of the debris. The machine learning model determines an offset between the predicted location of the debris and the target location of the debris and sends the offset to the targeting system. The targeting system directs the actuators to point the targeting camera and the debris collection implement toward the target location of the debris, and the debris collection implement collects the debris.

Additional position and acceleration sensors detect motion of the autonomous vehicle during the prediction, targeting, and debris collection process and provide updated coordinates to the targeting system to account for movement of the vehicle between image collection and debris collection.

Example 3

Automated Obstruction Identification and Removal in a Pipe Network

This example describes a system and method for automated identification and removal of an obstruction in a pipe network. An autonomous vehicle with a prediction camera, a targeting camera, and an obstruction removal implement autonomously navigates a pipe system. The pipe system has an irregular surface. The prediction camera images a region of the pipe surface and detects objects within the image. A trained identification machine learning model identifies the objects and selects an object that is identified as an obstruction.

A prediction system determines a predicted location of the obstruction using a calibration model and sends the predicted location to a targeting system. The targeting system is selected based on availability and proximity to the selected obstruction. The targeting system directs actuators controlling the targeting camera and the obstruction removal implement to point the targeting camera and the obstruction removal implement toward the predicted location of the obstruction. The targeting camera images the pipe surface at the predicted location of the obstruction, and a trained matching machine learning model determines whether the obstruction is located within the image, and the target location of the obstruction. The matching machine learning model determines an offset between the predicted location of the obstruction and the target location of the obstruction and sends the offset to the targeting system. The targeting system directs the actuators to point the targeting camera and the obstruction removal implement toward the target location of the obstruction, and the obstruction removal implement removes the obstruction.

Additional position and acceleration sensors detect motion of the autonomous vehicle during the prediction, targeting, and obstruction removal process and provide updated coordinates to the targeting system to account for movement of the vehicle between image collection and obstruction removal.

Example 4

Coordination of Satellite Imaging for Aerial Crop Management

This example describes a system and method to coordinate satellite imaging with drone imaging for automated aerial crop management. One or more aerial crop management drones, each with a targeting camera and pesticide dispenser, fly over fields of crops. The crop management drones are in communication with imaging satellites. The satellite images a region of the earth containing the fields of crops and sends the images to the crop management drones along with geolocation data for the images. A trained identification machine learning model identifies fields in the images and selects a field to be targeted.

A prediction system determines a predicted location of the field using a GPS location and sends the predicted location to a selected drone. The drone is selected based on availability and proximity to the selected obstruction. The targeting system of the drone directs actuators controlling the drone to position the targeting camera and the pesticide dispenser over the predicted location of the field. The targeting camera images the ground at the predicted location of the field, and a trained matching machine learning model determines whether the field is located within the image, and the target location of the field. The matching machine learning model determines an offset between the predicted location of the obstruction and the target location of the obstruction and sends the offset to the targeting system. The targeting system directs the drone to position the targeting camera and the pesticide dispenser over the target location of the field, and the pesticide dispenser dispenses pesticides on the field.

Additional position and acceleration sensors detect motion and GPS coordinates of the drone during the prediction, targeting, and obstruction removal process and provide position information of the drone relative to the image collection satellites.

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising:

a first imaging sensor;

a second imaging sensor;

one or more processors; and a memory comprising instructions that, when executed by the one or more processors, cause the system to perform operations comprising:

obtaining, using the first imaging sensor, a first image depicting a first region of a field, identifying a target of interest within the first region of the field depicted in the first image, determining a predicted location of the target of interest based on the first image;

obtaining, using the second imaging sensor, a second image depicting a second region of the field, wherein the second region includes the predicted location of the target of interest, identifying the target of interest within the second region of the field depicted in the second image, and determining a target location of the target of interest based on the second image.

2. The system of claim 1, wherein the first imaging sensor and the second imaging sensor are coupled to a movable platform.

3. The system of claim 2, wherein the predicted location accounts for motion of the movable platform relative to the target of interest between a time when the first image is obtained and a time when the second image is obtained.

4. The system of claim 2, wherein the target location accounts for motion of the movable platform relative to the target of interest between a time when the second image is obtained and a time when a manipulation of the target of interest is performed.

5. The system of claim 1, wherein the operations further comprise aiming the second imaging sensor toward the predicted location.

6. The system of claim 5, wherein aiming the second imaging sensor toward the predicted location comprises adjusting one or more of a position or an orientation of a reflective surface that directs light to the second imaging sensor.

7. The system of claim 5, wherein aiming the second imaging sensor toward the predicted location comprises controlling one or more of a position, an orientation, or a direction of the second imaging sensor.

8. The system of claim 1, wherein the target location is closer to the target of interest than the predicted location.

9. The system of claim 1, wherein the operations further comprise directing an implement toward the target location.

10. The system of claim 9, wherein a direction of the implement is correlated with a direction of the second imaging sensor.

11. The system of claim 9, wherein the operations further comprise manipulating the target of interest using the implement.

12. The system of claim 11, wherein the implement comprises a laser configured to emit a laser beam, and wherein manipulating the target of interest comprises emitting the laser beam toward the target of interest.

13. The system of claim 12, wherein the target of interest is a plant of interest, and wherein emitting the laser beam toward the plant of interest causes the laser beam to damage or kill the plant of interest.

14. The system of claim 9, wherein the implement comprises a grabbing implement, a spraying implement, a planting implement, a harvesting implement, a pollinating implement, a marking implement, a blowing implement, or a depositing implement.

15. The system of claim 1, wherein the first imaging sensor differs from the second imaging sensor with respect to one or more of the following: sensor type, sensor resolution, magnification, field of view, color balance, color sensitivity, or positioning.

16. The system of claim 1, wherein the target of interest is a plant of interest.

17. The system of claim 16, wherein the plant of interest is a weed or a crop.

18. The system of claim 1, wherein the first imaging sensor and the second imaging sensor each independently comprise one or more of the following: a camera, a light detection and ranging (LIDAR) sensor, a photodetector, an active-pixel sensor, a semiconductor detector, an ultrasound sensor, a RADAR detector, a sonar sensor, or a photodiode array.

19. The system of claim 16, wherein the operations further comprise differentiating between the plant of interest and other plants in the first image.

20. The system of claim 19, wherein the differentiating is performed using a machine learning model that is trained to differentiate between different types of plants.

* * * * *